United States Patent
Fels et al.

(10) Patent No.: US 10,904,631 B2
(45) Date of Patent: Jan. 26, 2021

(54) AUTO-COMPLETION FOR CONTENT EXPRESSED IN VIDEO DATA

(71) Applicant: Microsoft Technology Licensing, LLC, Redmond, WA (US)

(72) Inventors: Sol Sidney Fels, Vancouver (CA); Dongwook Yoon, Vancouver (CA); Matin Yarmand, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/389,853

(22) Filed: Apr. 19, 2019

(65) Prior Publication Data

US 2020/0336794 A1    Oct. 22, 2020

(51) Int. Cl.
*H04N 21/4788*    (2011.01)
*H04L 12/58*    (2006.01)
*G06F 40/205*    (2020.01)

(52) U.S. Cl.
CPC ....... *H04N 21/4788* (2013.01); *G06F 40/205* (2020.01); *H04L 51/046* (2013.01)

(58) Field of Classification Search
None
See application file for complete search history.

(56) References Cited

U.S. PATENT DOCUMENTS

| 7,941,762 B1* | 5/2011 | Tovino | H04L 51/046 379/201.01 |
| 2002/0120925 A1* | 8/2002 | Logan | H04N 7/17318 725/9 |
| 2002/0144273 A1* | 10/2002 | Reto | H04L 29/06027 725/86 |
| 2004/0098754 A1* | 5/2004 | Vella | H04N 5/445 725/135 |
| 2004/0260753 A1* | 12/2004 | Regan | H04L 51/04 709/200 |

(Continued)

OTHER PUBLICATIONS

Bakhshi, et al., "Faces engage us: Photos with faces attract more likes and comments on Instagram.", in Proceedings of the SIGCHI Conference on Human Factors in Computing Systems, Apr. 26, 2014, pp. 965-974.

(Continued)

*Primary Examiner* — Fernando Alcon
(74) *Attorney, Agent, or Firm* — Newport IP, LLC; Scott Y. Shigeta

(57) ABSTRACT

The present disclosure provides a computing device that performs an auto-completion process that generates and inserts text of spoken content of a video into a text entry field. By providing quoted content in a text input field, a system can mitigate the need for users to perform the tedious process of listening to spoken content of a video and manually entering the spoken content into a computing device. In some configurations, a system can receive one or more keywords from a user input and identify spoken content containing the keywords. The system can provide text of the spoken content based on a level of relevancy and populate one or more input fields with the text of the spoken content. The generation of auto completion text from spoken content of a video can enhance user interaction with the computer and maximize productivity and engagement with a video-based system.

20 Claims, 22 Drawing Sheets

(56) References Cited

U.S. PATENT DOCUMENTS

| | | | |
|---|---|---|---|
| 2006/0173821 | A1* | 8/2006 | Hennum .............. G06F 40/205 |
| 2007/0244902 | A1 | 10/2007 | Seide et al. |
| 2013/0154923 | A1* | 6/2013 | Mock ................ H04N 5/44543 345/157 |
| 2014/0067828 | A1* | 3/2014 | Archibong ....... H04N 21/23418 707/748 |
| 2014/0089801 | A1* | 3/2014 | Agrawal .............. G06F 3/0484 715/719 |
| 2014/0215360 | A1* | 7/2014 | Degani ................ G06F 3/0481 715/753 |
| 2015/0293996 | A1 | 10/2015 | Liu |
| 2016/0359771 | A1* | 12/2016 | Sridhar .................. H04L 51/02 |
| 2017/0017639 | A1* | 1/2017 | Bute ..................... H04W 8/205 |
| 2017/0154125 | A1* | 6/2017 | Balakrishnan ...... G06F 3/04842 |
| 2017/0180276 | A1* | 6/2017 | Gershony .............. H04L 51/02 |
| 2017/0249017 | A1* | 8/2017 | Ryu ...................... G06F 40/274 |
| 2018/0124438 | A1* | 5/2018 | Barnett ........... H04N 21/23424 |
| 2018/0211552 | A1 | 7/2018 | Samuelson et al. |
| 2018/0293313 | A1 | 10/2018 | Hauptmann et al. |
| 2019/0034483 | A1* | 1/2019 | Millius ................ G06F 16/335 |
| 2019/0197101 | A1* | 6/2019 | Lambert .............. G06F 3/0237 |
| 2020/0012718 | A1* | 1/2020 | Kung ..................... H04L 51/04 |

OTHER PUBLICATIONS

Bangor, et al., "Determining what individual SUS scores mean: Adding an adjective rating scale", in Journal of Usability Studies, vol. 4, Issue 3, May 1, 2009, 8 Pages.

Brooke, John, "SUS—A quick and dirty usability scale", in Proceedings of Usability evaluation in industry, vol. 189, Issue 194, Sep. 1996, 7 Pages.

Brush, et al., "Supporting Interaction Outside of Class: Anchored Discussions vs. Discussion Boards", in Proceedings of the Conference on Computer Support for Collaborative Learning: Foundations for a CSCL Community, Jan. 7, 2002, 10 Pages.

Chorianopoulos, Konstantinos, "A taxonomy of asynchronous instructional video styles", in the Proceedings of International Review of Research in Open and Distributed Learning, vol. 19, Issue 1, Feb. 1, 2018, pp. 294-311.

Christensen, et al., "The MOOC phenomenon: Who takes massive open online courses and why", in SSRN eLibrary, Dec. 2014, 9 Pages.

Chua, et al., "Facilitating complex referencing of visual materials in asynchronous discussion interface", in Proceedings of the ACM on Human-Computer Interaction, vol. 1, Issue 2, Article 34, Nov. 2017,19 Pages.

Clark, et al., "Grounding in communication", in American Psychological Association from Perspectives on Socially Shared Cognition, Jan. 1, 1991, pp. 127-149.

Clark, Herbert H., "Using language", by Cambridge University Press, 1996, 58 Pages.

Dorn, et al., "Piloting TrACE: Exploring Spatiotemporal Anchored Collaboration in Asynchronous Learning", in Proceedings of the 18th ACM Conference on Computer Supported Cooperative Work & Social Computing Mar. 14, 2015, pp. 393-403.

Fong, et al., "ViDeX: A platform for personalizing educational videos", in Proceedings of the 18th ACM/IEEE Joint Conference on Digital Libraries, Jun. 033, 2018, pp. 331-332.

Fussell, et al., "Gestures Over Video Streams to Support Remote Collaboration on Physical Tasks", in Journal of Human-Computer Interaction, vol. 19, Issue 3, Sep. 1, 2004, pp. 273-309.

Gergle, et al., "Language Efficiency and Visual Technology: Minimizing Collaborative Effort with Visual Information.", in Journal of Language and Social Psychology, vol. 23, Issue 4, Dec. 1, 2004, pp. 491-517.

Glassman, et al., "Mudslide: A Spatially Anchored Census of Student Confusion for Online Lecture Videos", in Proceedings of the 33rd Annual ACM Conference on Human Factors in Computing Systems, Apr. 18, 2015, pp. 1555-1564.

Hupet, et al., "The effects of the codability and discriminability of the referents on the collaborative referring procedure", in British Journal of Psychology, vol. 82, Issue 4, Nov. 1991, pp. 449-462.

Jones, et al., "Talking Text and Talking Back: "My BFF Jill" from Boob Tube to YouTube", in Journal of Computer-Mediated Communication, vol. 14, Issue 4, Jul. 1, 2009, pp. 1050-1079.

Kavada, Anastasia, "Engagement, bonding, and identity across multiple platforms: Avaaz on Facebook, YouTube, and MySpace", in MedieKultur: Journal of media and communication research, vol. 28, Issue 52, Mar. 30, 2012, 21 Pages.

Khan, Laeeq M., "Social media engagement: What motivates user participation and consumption on YouTube?", in Journal of Computers in Human Behavior,Jan. 1, 2017, pp. 236-247.

Kim, et al., "Crowdsourcing step-by-step information extraction to enhance existing how-to videos", in Proceedings of the SIGCHI Conference on Human Factors in Computing Systems, Apr. 26, 2014, pp. 4017-4026.

Kirk, et al., "Turn It This Way: Grounding Collaborative Action with Remote Gestures", in Proceedings of the SIGCHI Conference on Human Factors in Computing Systems, Apr. 28, 2007, pp. 1039-1048.

Lajoie, et al., "Computers as cognitive tools", in Journal of Computing in Higher Education, Mar. 1995.

Lee, et al., "Detecting and Visualizing the Dispute Structure of the Replying Comments in the Internet Forum Sites", in Proceedings of International Conference on Cyber-Enabled Distributed Computing and Knowledge Discovery, Oct. 10, 2010, pp. 456-463.

Leetiernan, Scott, "Fostering Engagement in Asynchronous Learning through Collaborative Multimedia Annotation", in Technical Report MSR-TR-2000-91, Interact, Jul. 1, 2001, 8 Pages.

Madden, et al., "A classification scheme for content analyses of YouTube video comments", in Journal of Documentation, vol. 69, Issue 5, Sep. 2, 2013, pp. 693-714.

Molyneaux, et al., "Exploring the gender divide on YouTube: An analysis of the creation and reception of vlogs", in American Communication Journal, vol. 10, Issue 2, Jan. 2008, 14 Pages.

Mu, Xiangming, "Towards effective video annotation: An approach to automatically link notes with video content", in Journal of Computers & Education, vol. 55, Issue 4, Dec. 1, 2010, pp. 1752-1763.

Pavel, et al., "VidCrit: Video-based asynchronous video review", in Proceedings of the 29th Annual Symposium on User Interface Software and Technology, Oct. 16, 2016, pp. 517-528.

Potthast, et al., "Opinion summarization of web comments", in Proceedings of the 32nd European Conference on Information Retrieval, Mar. 28, 2010, pp. 668-669.

Roll, Ido, "Learning at Scale", International Journal of Artificial Intelligence in Education, vol. 28, Issue 4, Dec. 2018, pp. 471-477.

Rotman, et al., "The'WeTube'in YouTube—creating an online community through video sharing", in International Journal of Web Based Communities, vol. 6, Issue 3, Jan. 1, 2010, pp. 317-333.

Schultes, et al., "Leave a comment! an in-depth analysis of user comments on YouTube", 11th International Conference on Wirtschaftsinformatik, vol. 42, Feb. 27, 2013, pp. 659-673.

Siemens, George, "Connectivism : A learning theory for the digital age", Retreived From http://www.edtechpolicy.org/AAASGW/Session2/siemens_article.pdf, Jan. 5, 2005, 10 Pages.

Siersdorfer, et al., "How useful are your comments?: Analyzing and predicting YouTube comments and comment ratings", in Proceedings of the 19th International Conference on World Wide Web, Apr. 26, 2010, pp. 891-900.

Thomas, Matthew JW., "Learning within incoherent structures: The space of online discussion forums", in Journal of Computer Assisted Learning, vol. 18, Issue 3, Dec. 11, 2002, pp. 351-366.

Thompson, Clive, "How Khan Academy is changing the rules of education", in Wired Magazine , vol. 126, Jul. 15, 2011, pp. 1-5.

Tsang, et al., "Boom Chameleon: Simultaneous capture of 3D viewpoint, voice and gesture annotations on a spatially-aware display", in Proceedings of the 15th annual ACM symposium on User interface software and technology, Oct. 27, 2002, 10 Pages.

Vygotsky, Lev S., "Mind in society: the development of higher psychological processes", in Publication of Harvard University Press, Oct. 15, 1980, 170 Pages.

(56) References Cited

OTHER PUBLICATIONS

Welbourne, et al., "Science communication on YouTube: Factors that affect channel and video popularity", in Journal of Public Understanding of Science, vol. 25, Issue 6, Aug. 2016, 12 Pages.

Yoon, et al., "RichReview: Blending Ink, Speech, and Gesture to Support Collaborative Document Review", in Proceedings of the 27th Annual ACM Symposium on User Interface Software and Technology, Oct. 5, 2014, pp. 481-490.

Yuan, et al., "Automatic Video Genre Categorization Using Hierarchical SVM", in Proceedings of the IEEE International Conference on Image Processing, Oct. 8, 2006, pp. 2905-2908.

Zyto, et al., "Successful Classroom Deployment of a Social Document Annotation System", in Proceedings of the SIGCHI Conference on Human Factors in Computing Systems, May 5, 2012, pp. 1883-1892.

Li, et al., "Classification of General Audio Data for Content-Based Retrieval", in Journal of Pattern Recognition Letters, vol. 22, Issue 5, Apr. 2001, pp. 533-544.

"International Search Report and Written Opinion Issued in PCT Application No. PCT/US2020/025847", dated Jul. 17, 2020, 14 Pages.

\* cited by examiner

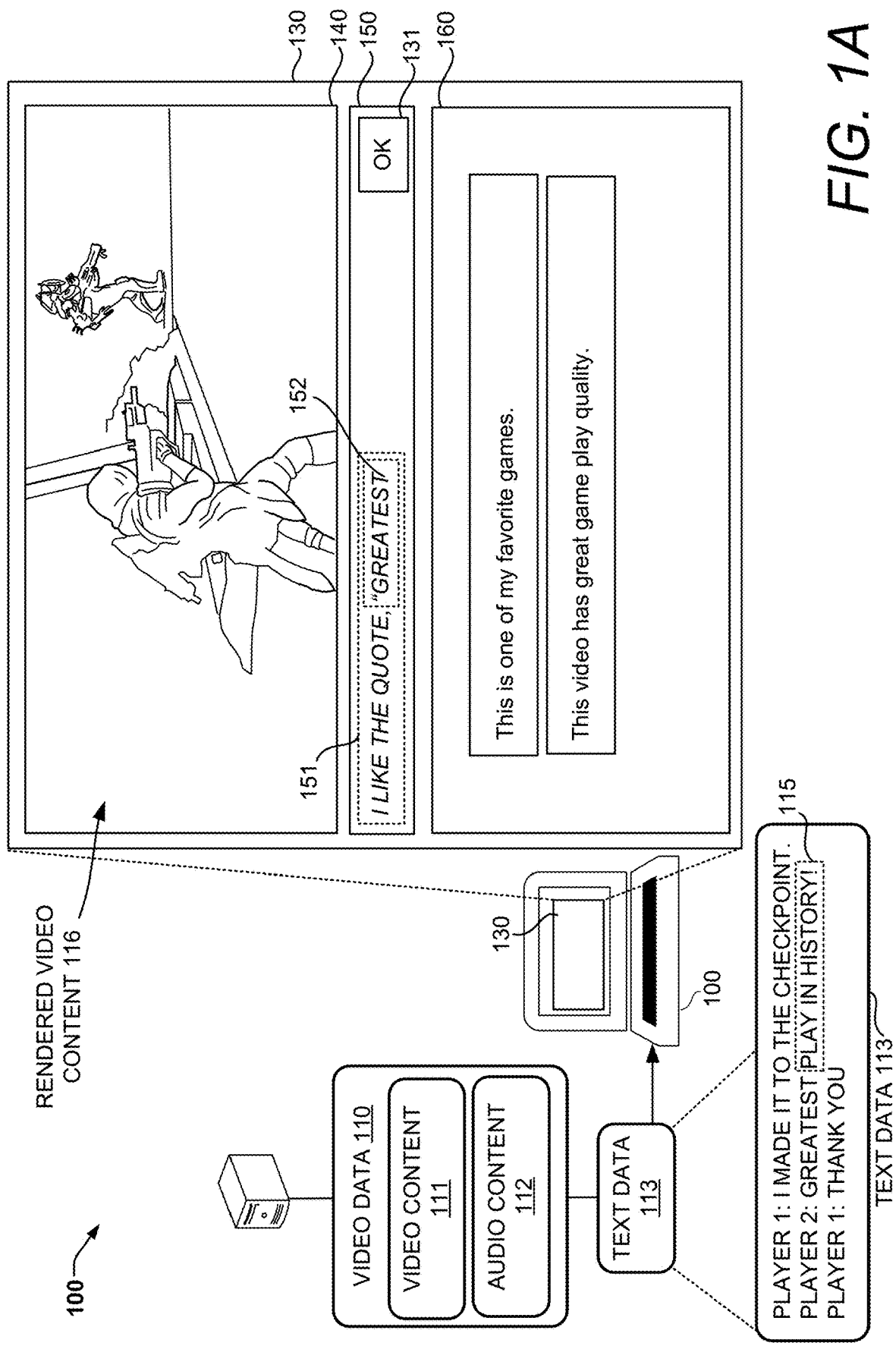

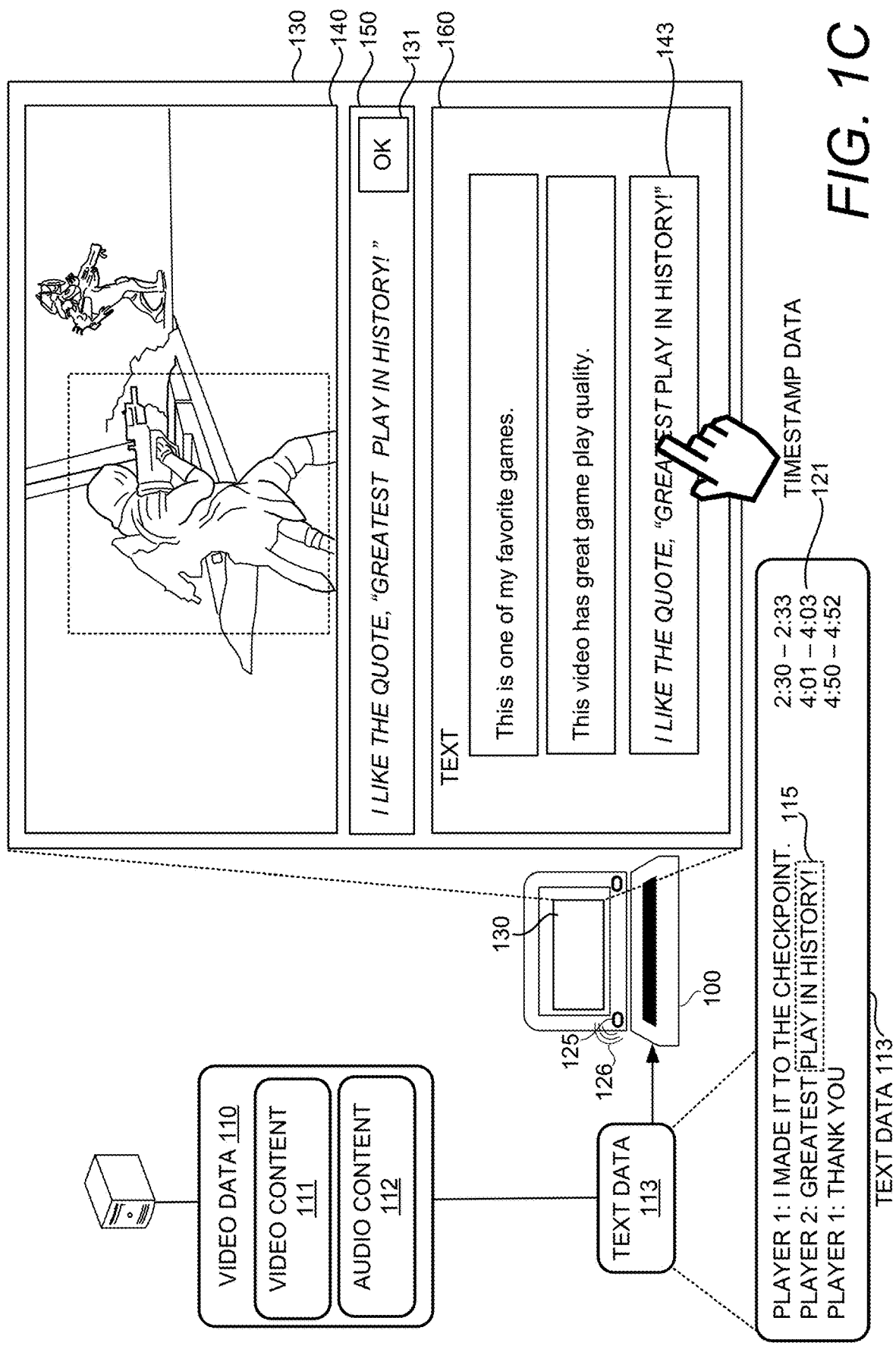

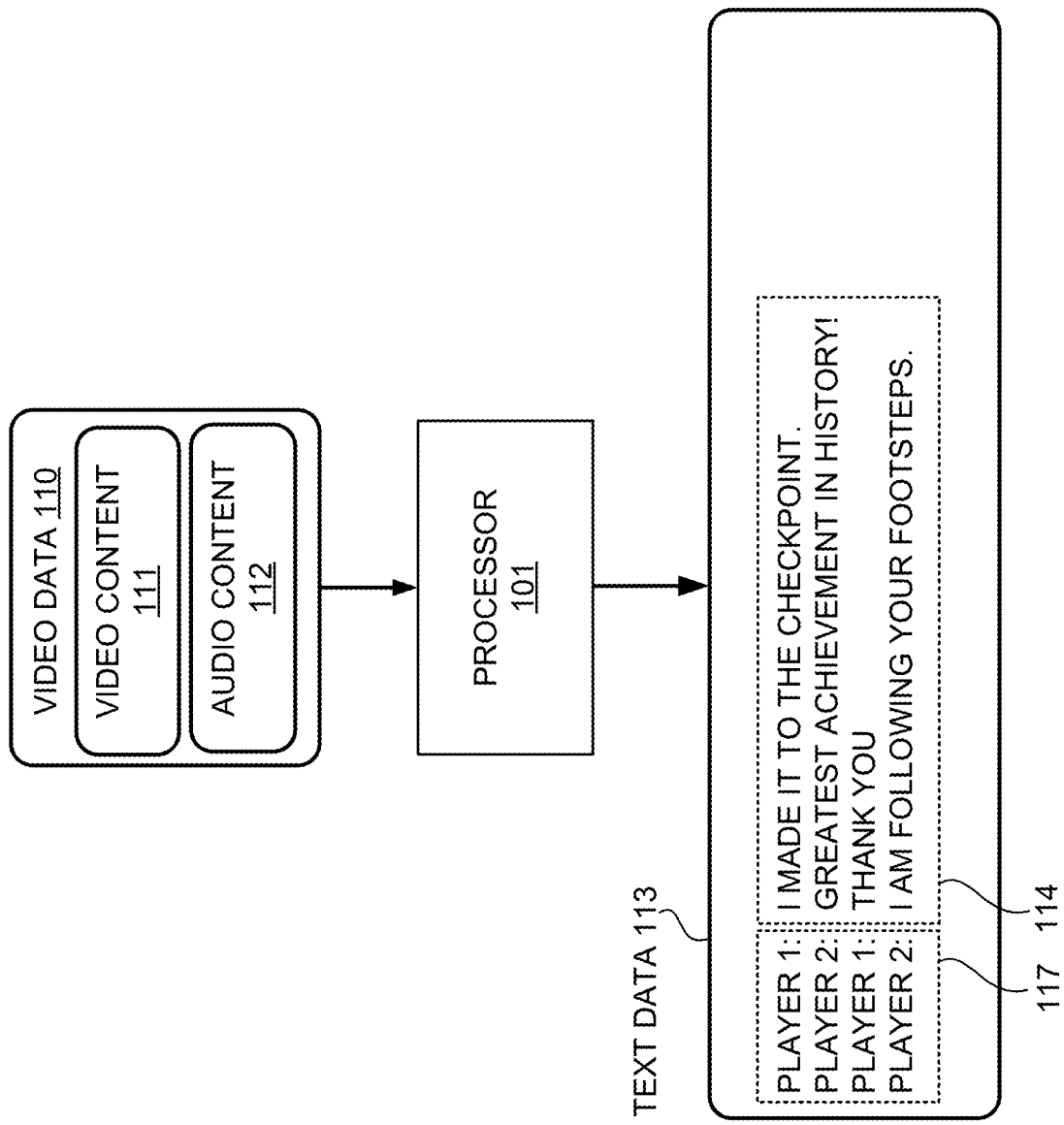

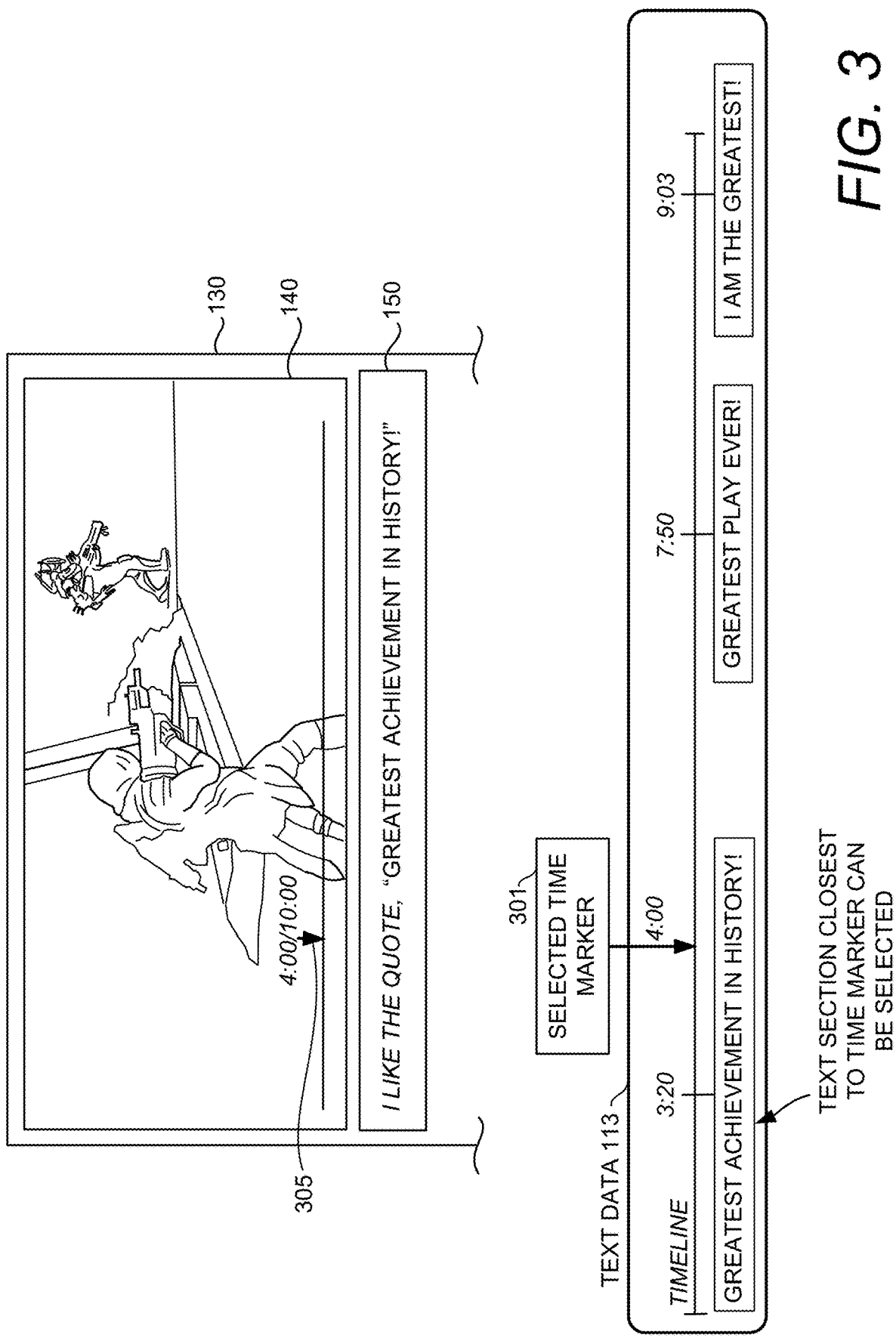

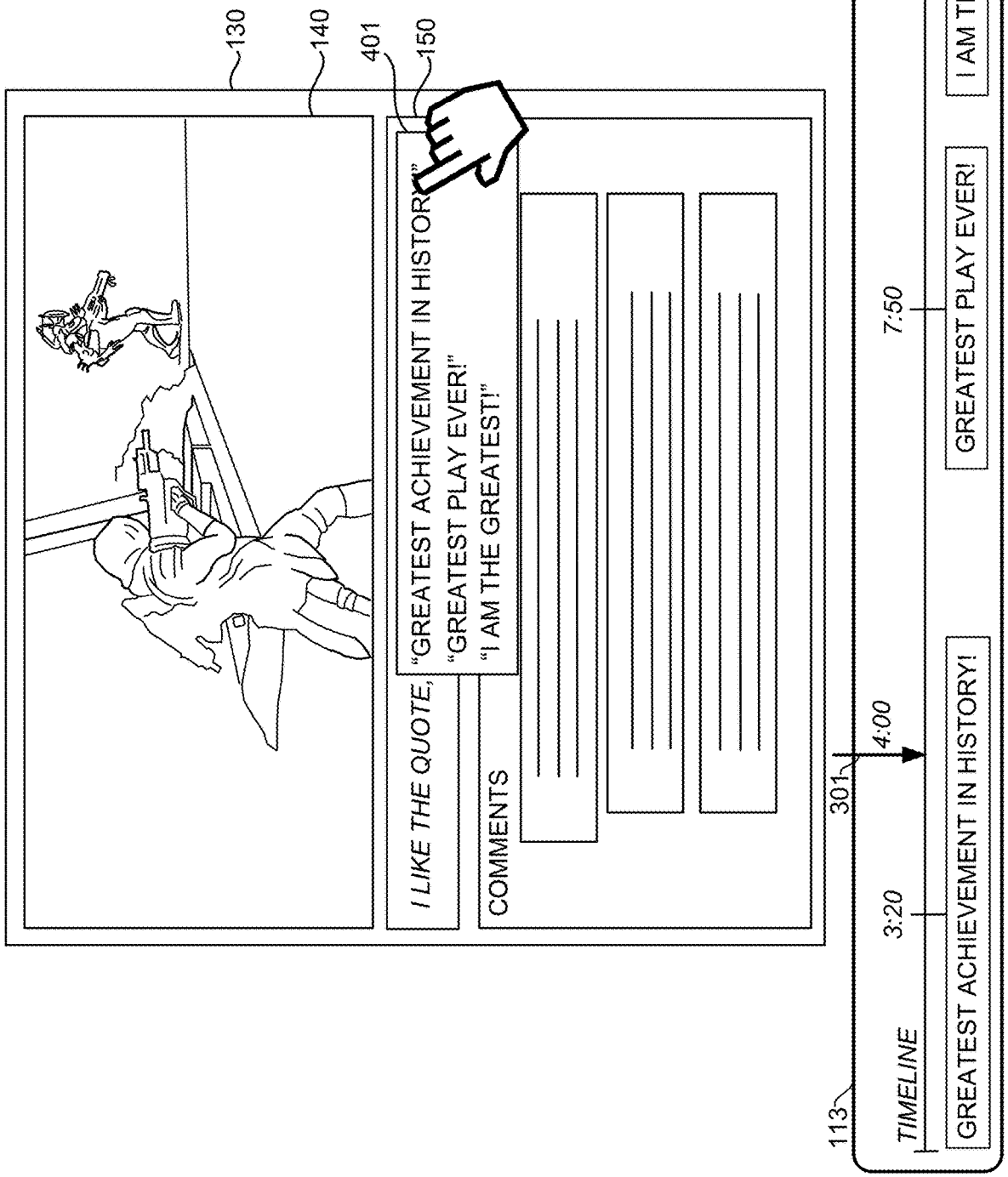

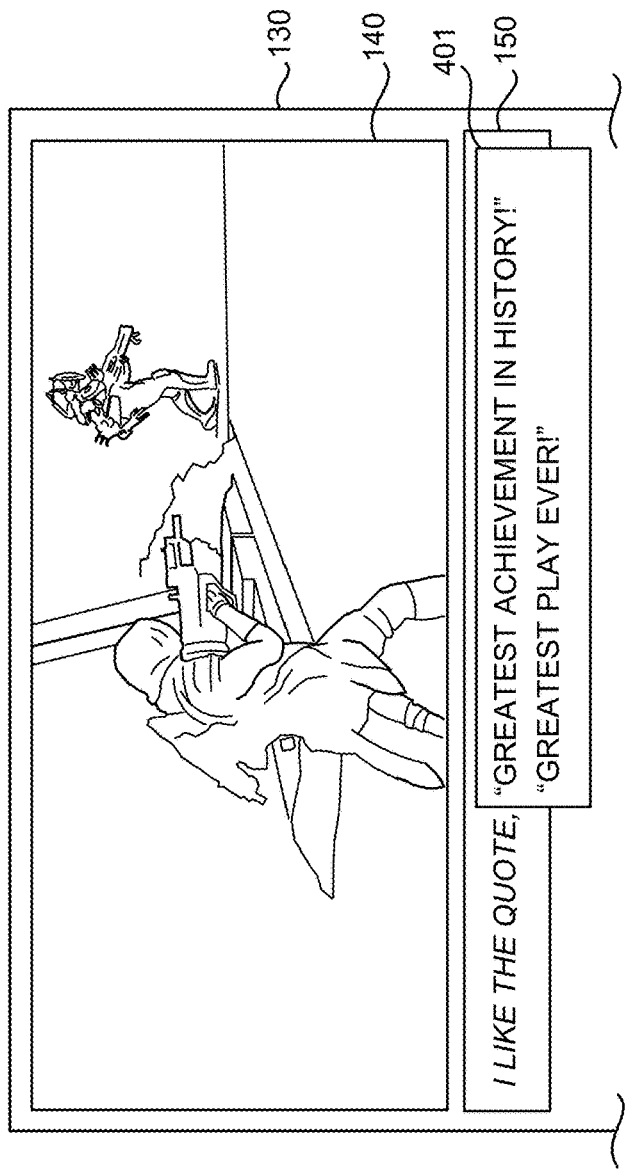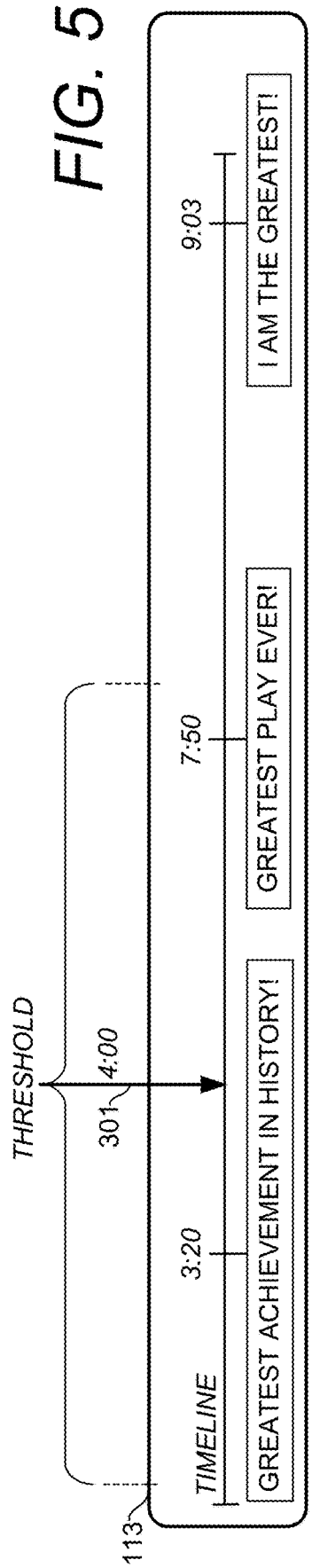
FIG. 5

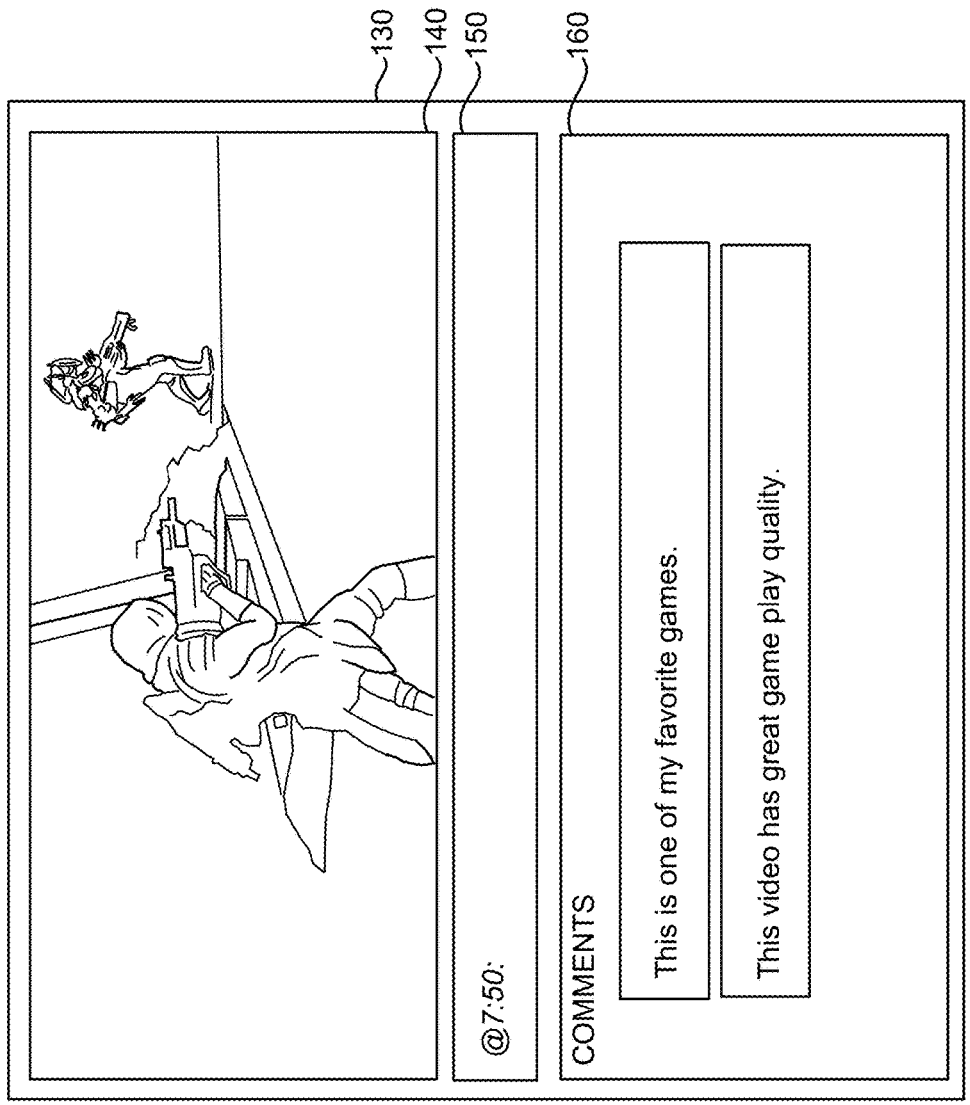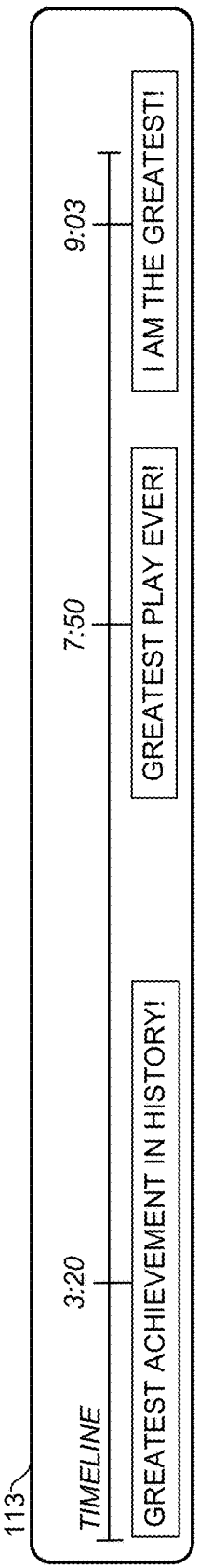
FIG. 6A

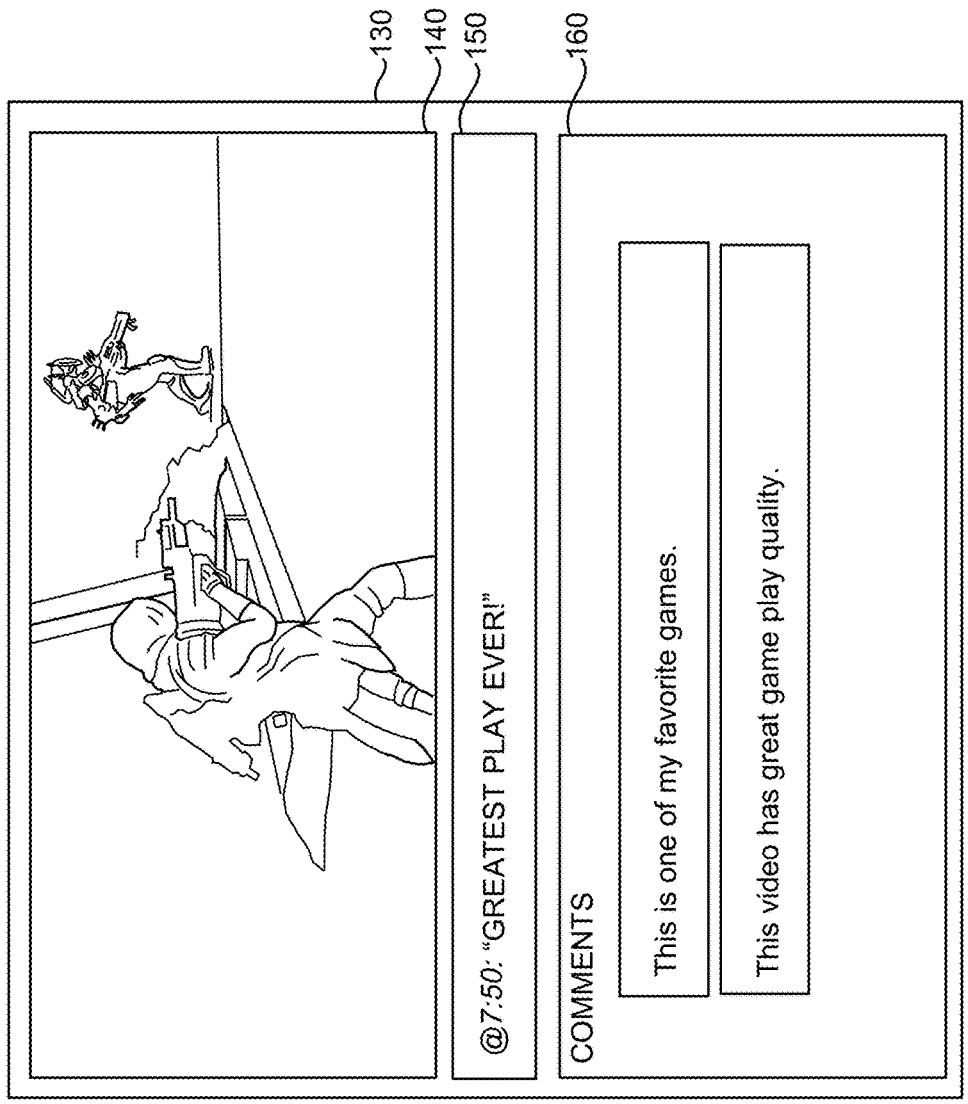
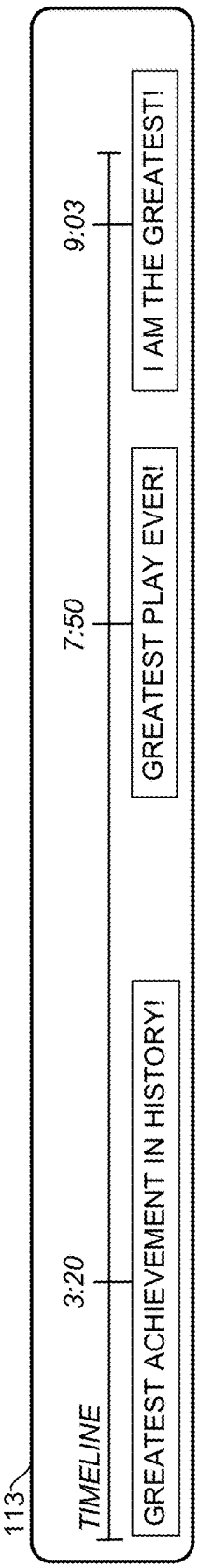
FIG. 6B

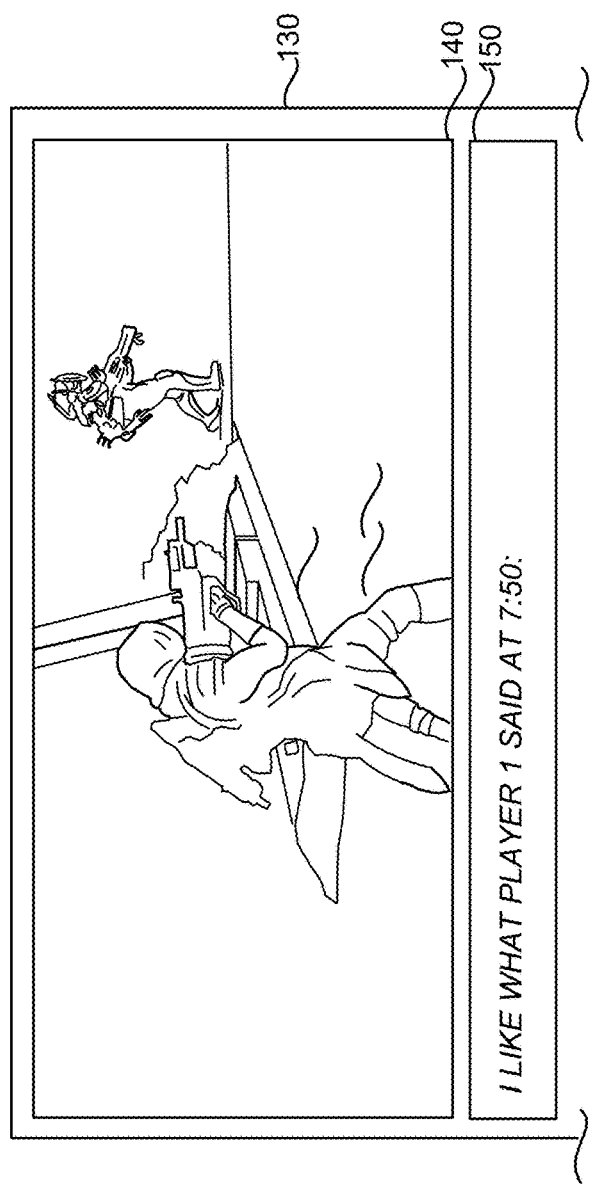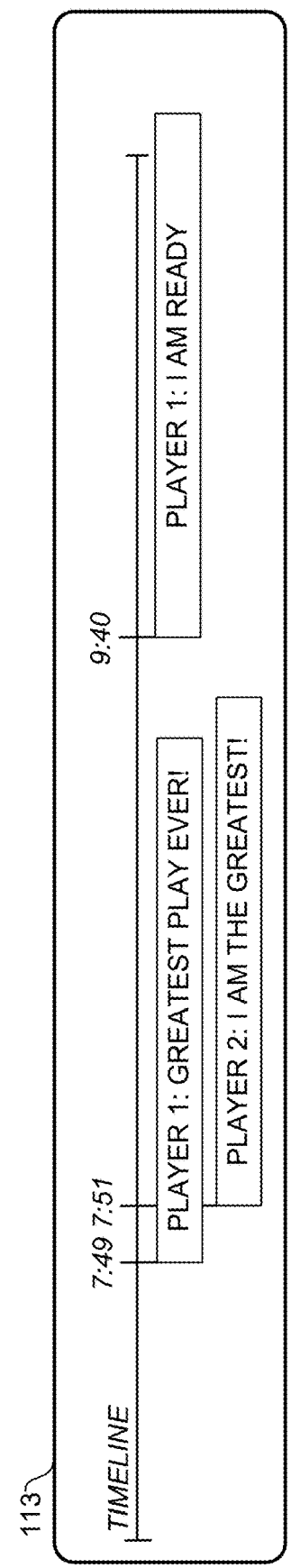
FIG. 7A

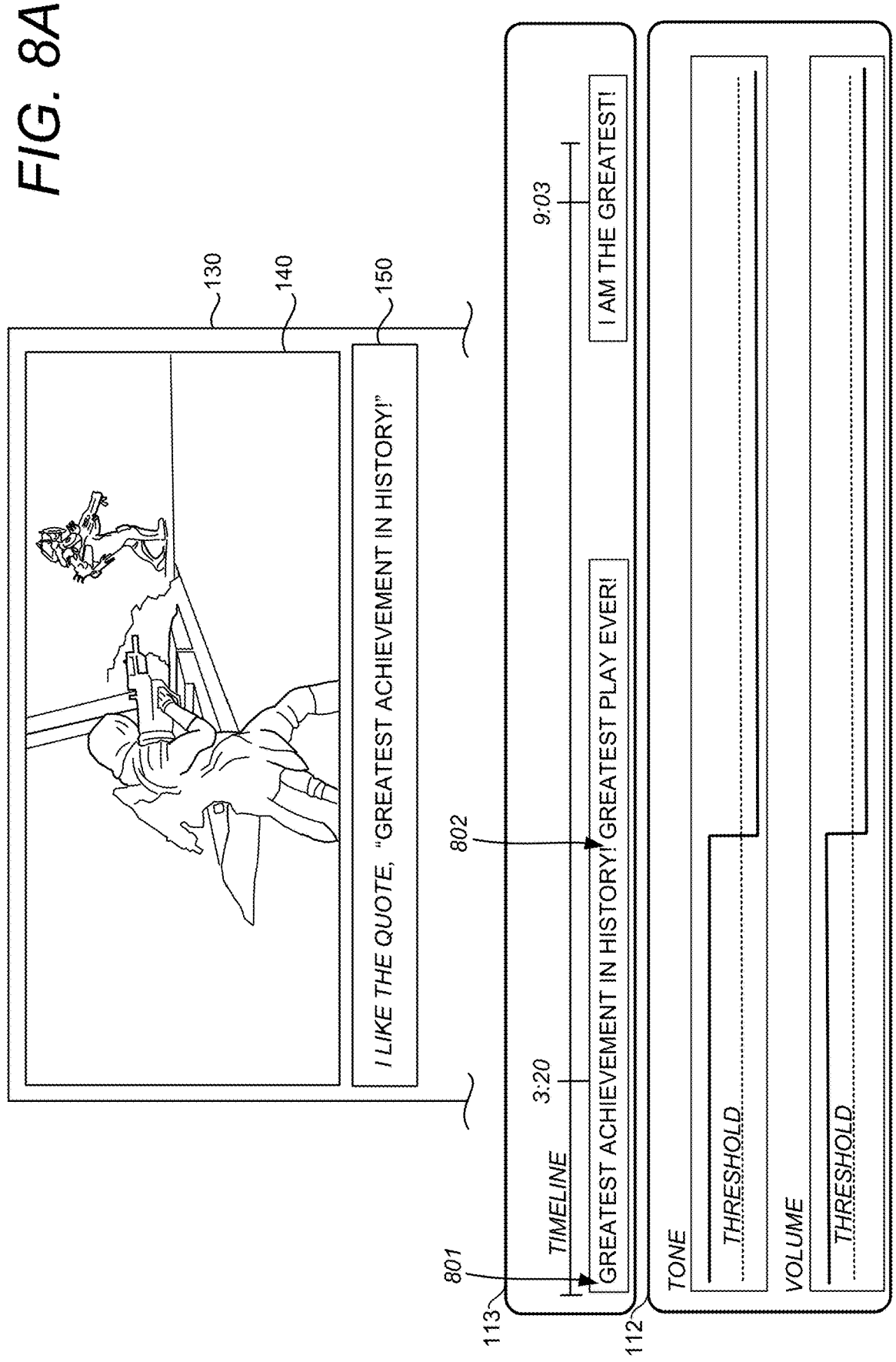

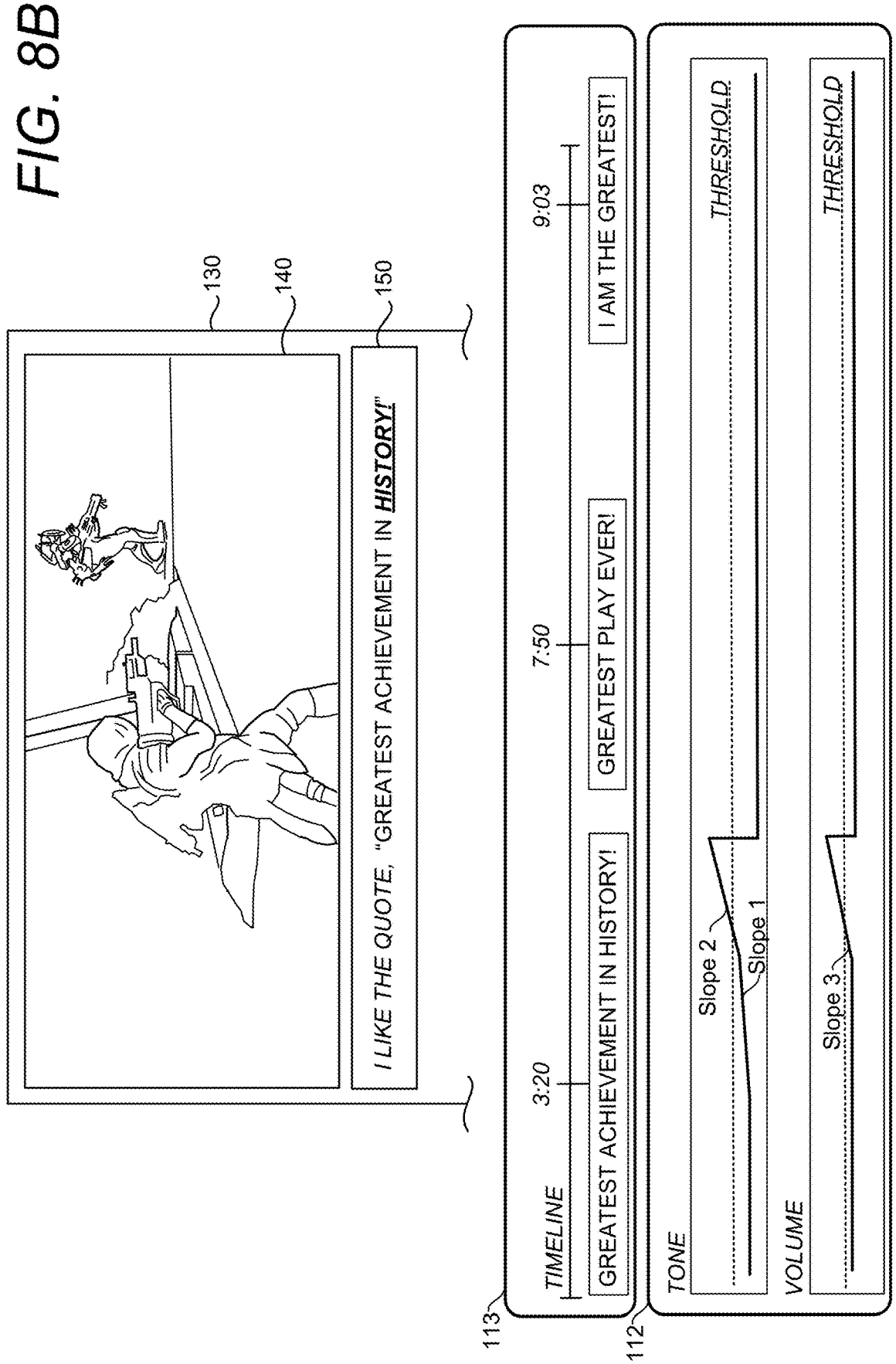

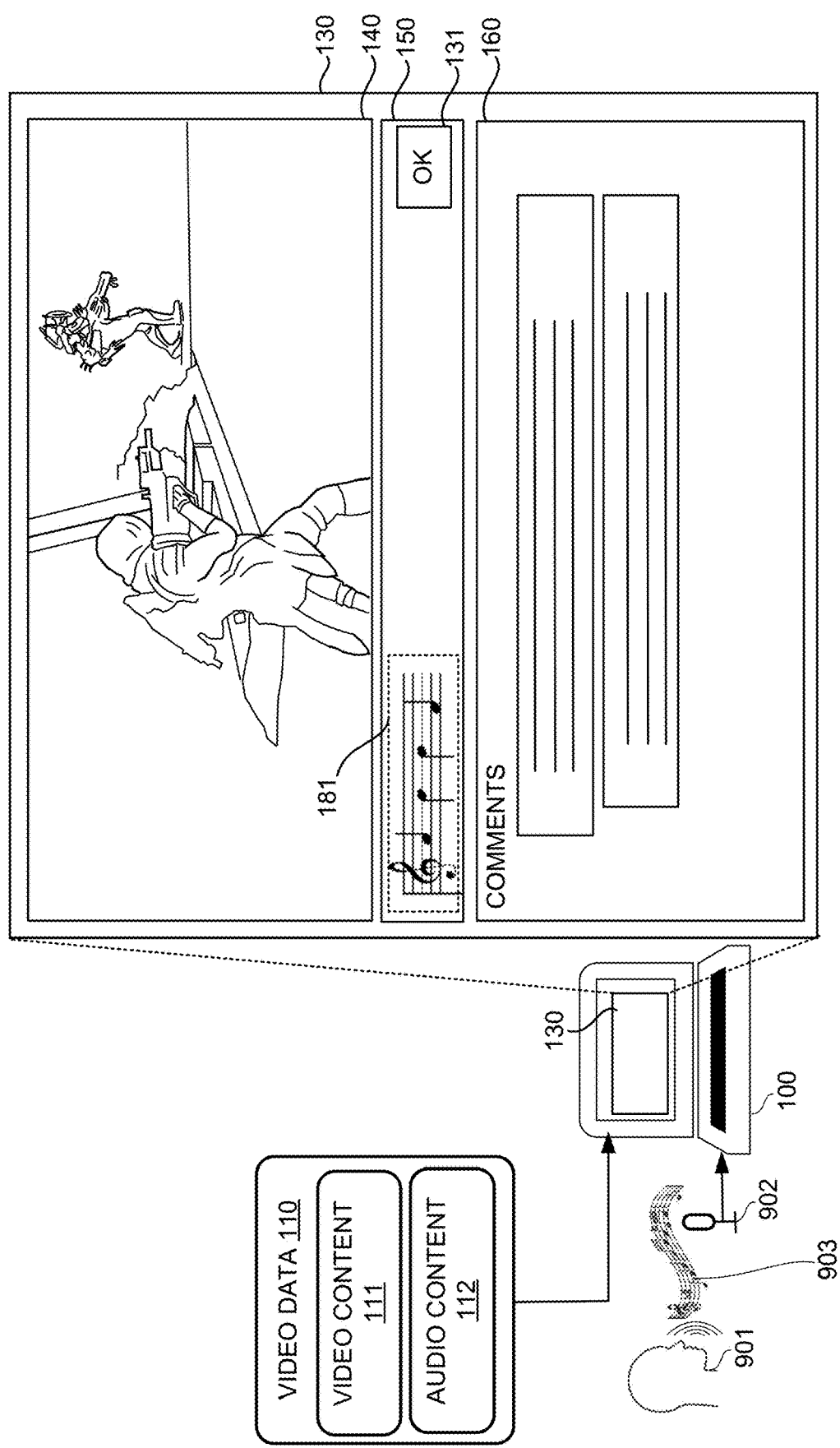

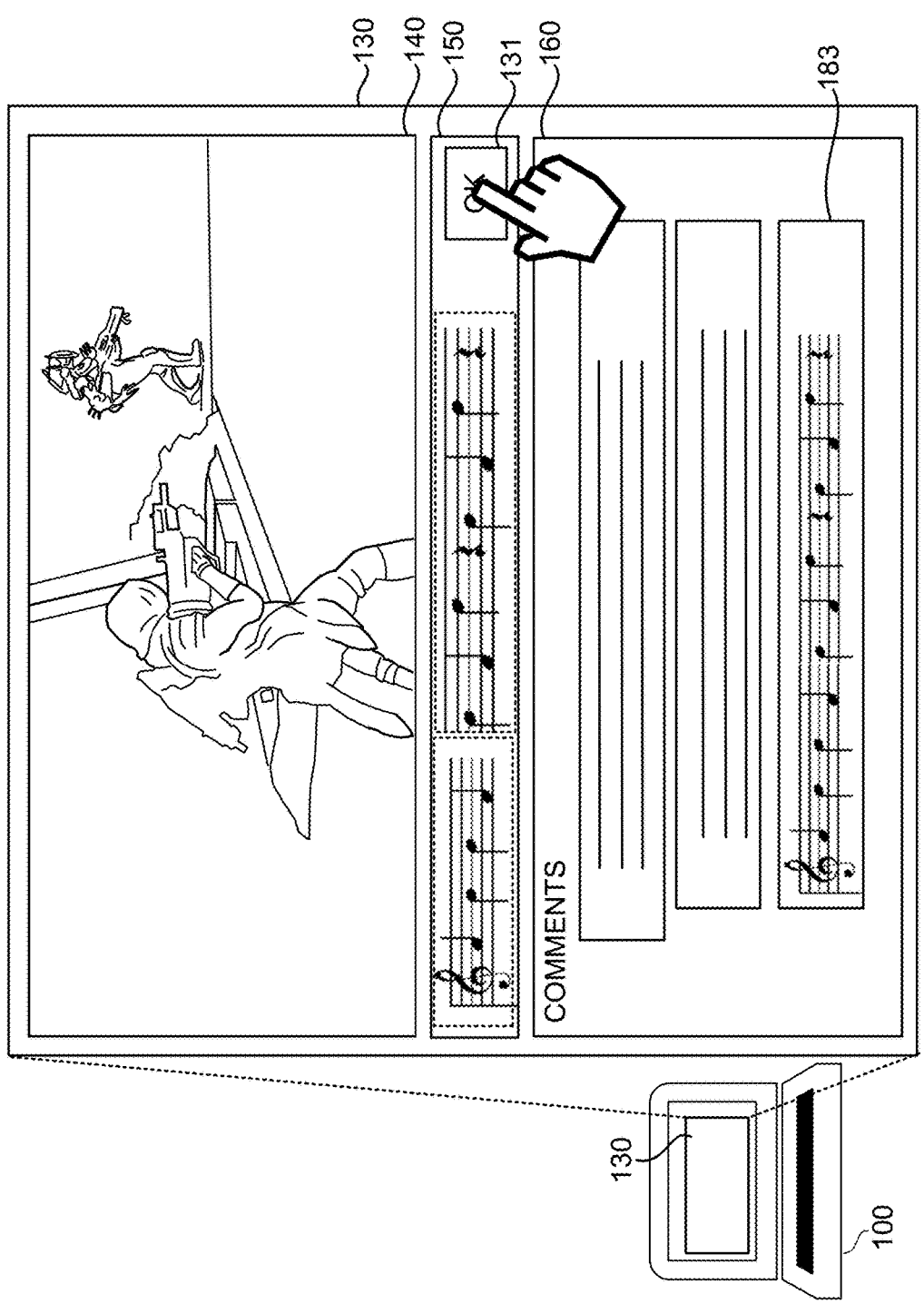

ID
AUTO-COMPLETION FOR CONTENT EXPRESSED IN VIDEO DATA

BACKGROUND

Commenting on videos is becoming popular and ubiquitous on many social, educational, and recreational platforms. Many video-based commenters refer to the video content to contextualize and specify their messages. Commenters can refer to visual entities or specific sound bites in a number of ways. For instance, users can refer to a sound or a quote of a person at a particular time or provide a timestamp to allow viewers to play a video starting at a particular point in time. Such features play a key role in influencing user engagement, and ultimately, play a key role in a level of user traffic and user retention.

Although existing video-based platforms provide features that allow users to provide comments, most user interfaces that exist today are simplistic in nature and do not provide tools for optimizing the user experience. Many sites follow a traditional model that includes a video display area, a text entry field, and a comment section. Users are often required to manually enter text in the text entry field, which is cumbersome and inefficient both with respect to user productivity and computing resources. Such inefficiencies are exacerbated when complex tasks are to be performed. For instance, if a user would like to provide a quote from spoken content of a video, the user is required to play the video incrementally and manually transcribe the spoken content. This traditional practice can lead to inaccuracies with respect to comments. Moreover, such traditional practices can lead to inefficient use of computing resources as commenters may be required to replay sections of a video multiple times to transcribe the content. Such issues can negatively impact a number of performance metrics for a site.

It is with respect to these and other technical challenges that the disclosure made herein is presented.

SUMMARY

The techniques disclosed herein provide improvements over existing systems by enabling computing devices to perform an auto-completion process that generates and inserts text of spoken content of a video into a text input field. By providing quoted content in a text input field, a system can mitigate the need for users to perform the tedious process of listening to spoken content of a video and manually entering the spoken content into a computing device. In some configurations, a system can receive one or more keywords from a user input and identify spoken content in the video containing the keywords. The system can provide text of the spoken content based on a level of relevancy and populate one or more input fields with the text of the spoken content.

The techniques described herein provide a number of benefits. For example, by providing an auto-completion process that generates and inserts spoken content in a text input field from a video, the techniques disclosed herein can increase user engagement both from an individual perspective and a community perspective. Specifically, by providing a mechanism that automates the process of generating input text containing spoken content, a system can enable users to post more accurate statements in a comment section of a video platform while minimizing the amount of manual interactions that are required to generate comments. From a community standpoint, user engagement can also be optimized. Some usage data shows that a comment containing spoken content from a video (also referred to herein as "quoted content") is more likely to receive a response versus a comment that does not include spoken content of a video. The systems described herein not only help users provide more accurate comments containing spoken content, but by providing suggested line completion content to a user's input, the system can encourage users to provide quoted content in situations where they may not have otherwise provided such information. Such features can encourage certain types of user activity which ultimately enhances user engagement with a video-based system.

For illustrative purposes, the term "spoken" content can include any type of language, melody, or sound that can be produced by an entity or person. The spoken content can be interpreted from any form of input received from an input device, such as a microphone, or any type of sound that can be interpreted from audio data to generate any type of notation, including symbols, text, images, code or any other data that can represent a sound.

The techniques described herein can lead to more efficient use of computing systems. In particular, by automating the generation of an input string having quoted content of a video, user interaction with the computing device can be improved. The techniques disclosed herein can eliminate a number of manual steps that require additional computing resources. For instance, for a person to transcribe audio content from a video stream, the user may have to play the video a number of times to ensure they are able to capture the content accurately. This causes a computing device to retrieve video data and use a number of computing resources, including memory resources and processing resources, to play and replay the video and the corresponding audio while transcribing the content. Elimination of these manual steps leads to more efficient use of computing resources such as memory usage, network usage, and processing resources, since it eliminates the need for a person to retrieve, render both audio and video data, and review the rendered data. In addition, the reduction of manual data entry and improvement of user interaction between a human and a computer can result in a number of other benefits. For instance, by reducing the need for manual entry, inadvertent inputs and human error can be reduced. Fewer manual interactions and a reduction of inadvertent inputs can avoid the consumption of computing resources that might be used for correcting or reentering data created by inadvertent inputs.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates an example scenario where a system can be used in an auto-completion process for providing spoken content from a video.

FIG. 1C illustrates aspects of a playback process for rendering an audio output in response to receiving a selection of a link within a text section.

FIG. 2 is a block diagram showing components of a process for generating text data from video data.

FIG. 3 illustrates an example of a user interface displaying a relevant section of text based on text data having a timeline associated with a number of sections of text.

FIG. 4 illustrates an example graphical user interface having a menu of ranked options for allowing a user to select spoken content.

FIG. 5 illustrates an example graphical user interface having a filtered menu of options for selecting spoken content.

FIG. 6A illustrates an example of a user interface having input text indicating a specified time of a video.

FIG. 6B illustrates an example of a section of text that is selected based on input text indicating a specified time of a video.

FIG. 7A illustrates an example of a user interface having input text indicating a specified time of a video and an entity.

FIG. 8A illustrates a user interface displaying a section of text that is selected based on characteristics of an audio file.

FIG. 8B illustrates a user interface displaying a section of text that is formatted based on characteristics of an audio file.

FIG. 9A illustrates a form of notation that can be generated based on characteristics of a user input captured by a microphone of a computer.

FIG. 9C illustrates one example of how the generated notation can be used to populate one or more sections of a document.

DETAILED DESCRIPTION

Figure 1B:
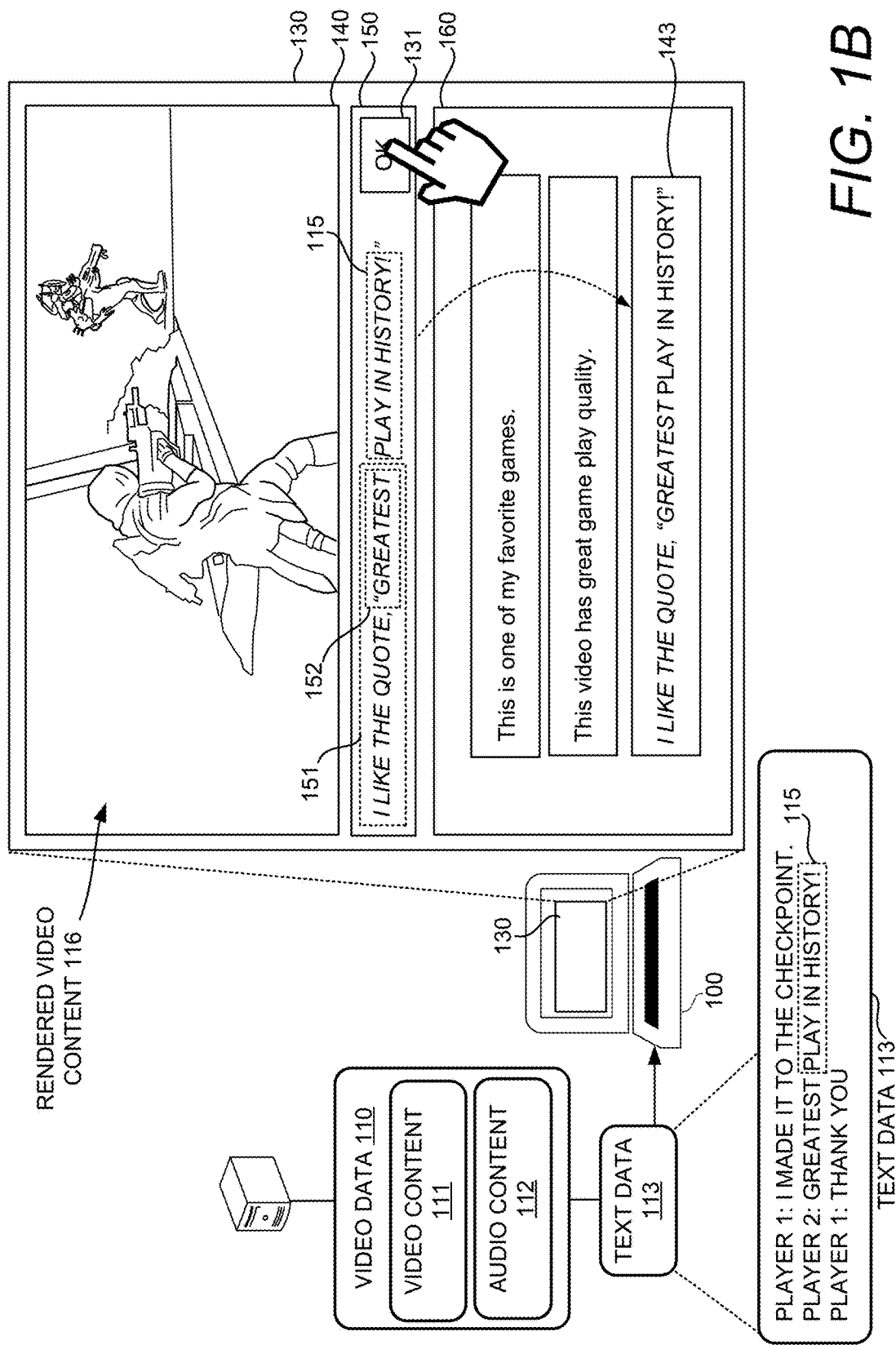
FIG. 1B illustrates steps of an auto-completion process for providing spoken content from a video.

FIGS. 1A and 1B illustrate an example scenario where a system can be used in an auto-completion process for providing quoted content from a video. In general, the system can analyze a user input to identify quoted content that is expressed in a video. The quoted content can be automatically populated into an input field for the purposes of assisting a user in generating a comment that includes quoted content from the video. Instead of requiring users to manually transcribe audio content of a video, the system can receive one or more keywords from a user input and identify quoted content in the video containing the keywords. The quoted content can then be populated in an input field.

As shown in FIG. 1A, the system 100 can cause a display of a user interface 130 comprising a video display area 140, a text entry field 150, and a comment section 160. The system 100 can receive video data 110 having video content 111 and audio content 112. The system can also receive text data 113 associated with the video data 110. In one illustrative example, the text data 113 can be in the form of closed captioning text and have a number of different phrases that are associated with a timeline of the video content 111 and the audio content 112. The system 100 can process the video content 111 to generate rendered video content 116 for display within the video display area 140. In addition, the system 100 can process the audio content 112 to generate a rendering of the audio content 112 through an endpoint device such as a speaker.

The user interface 130 can be configured to receive input text 151 at the text entry field 150. The input text 151 comprises at least one keyword 152. In some embodiments, the keyword 152 may be distinguished from other words of the input text 151 by the use of a special character, such as a single quotation mark or double quotation marks. In this example, the keyword 152 GREATEST is identified since it immediately follows the first quotation mark of a phrase in double quotation marks.

The system 100 can then identify a portion 115 of the text data 113 based on the keyword 152. Then, as shown in FIG. 1B, the system 100 can then insert the portion 115 of the text data 113 having the at least one keyword 152 in the text entry field 150. In this example, the portion of the text data PLAY IN HISTORY is identified in the text data 113 based on the keyword 152 GREATEST. If the user wishes to continue entering the rest of the quote manually, the user can press a predetermined key, such as the ESC key, and the system will remove the portion 115 of the text data 113.

In some configurations, the user interface 130 can include an interface element 131 for receiving an input. The user interface 130 can also be configured to display the portion 115 of the text data 113 and the user input 151 in the comment section 160 responsive to receiving an input at the interface element 131. For illustrative purposes, a delineated section of text, such as a sentence with punctuation, can be referred to herein as a "portion 115" of the text data 113, a "section 115" of the text data 113, or a "section of text 115." In some configurations, the portion 115 of the text data 113 can be inserted into the generated comment 143 or other graphical element. The comment 143 can be configured with a link that invokes a playback of audio data associated with the portion 115 of the text data 113. The link can cause a playback of the audio content 112 at a particular interval of time. In some embodiments, the interval of time can be derived from timestamp data 121 associated with the text data 113. The timestamp data can include a particular point in time or the timestamp data can indicate an interval in which the system 100 can generate an audio output 126 from a speaker 125 of the system 100.

FIG. 1C illustrates aspects of a playback process for rendering an audio output in response to receiving a selection of a link within a text section. In this illustrative example, when the user selects the generated comment 143, the system can render the audio output 126 from a speaker 125 of the system 100. In some configurations, the timestamp data 121 can be utilized to control the playback of the audio content 112. The playback can be based on the timestamp data 121.

Figure 1D:
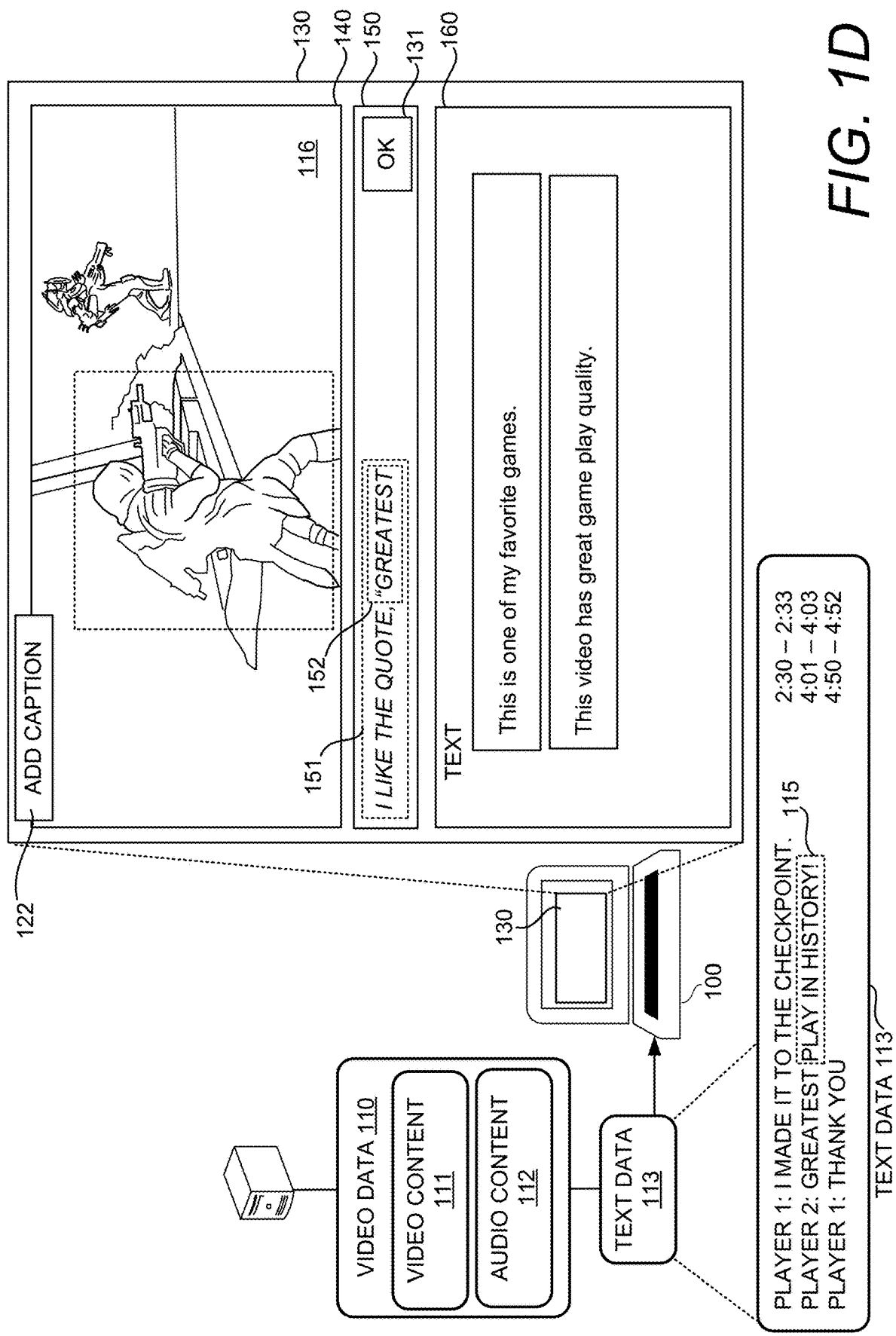
FIG. 1D illustrates aspects of an auto completion process that utilizes a graphical menu for obtaining a caption.
Figure 1E:
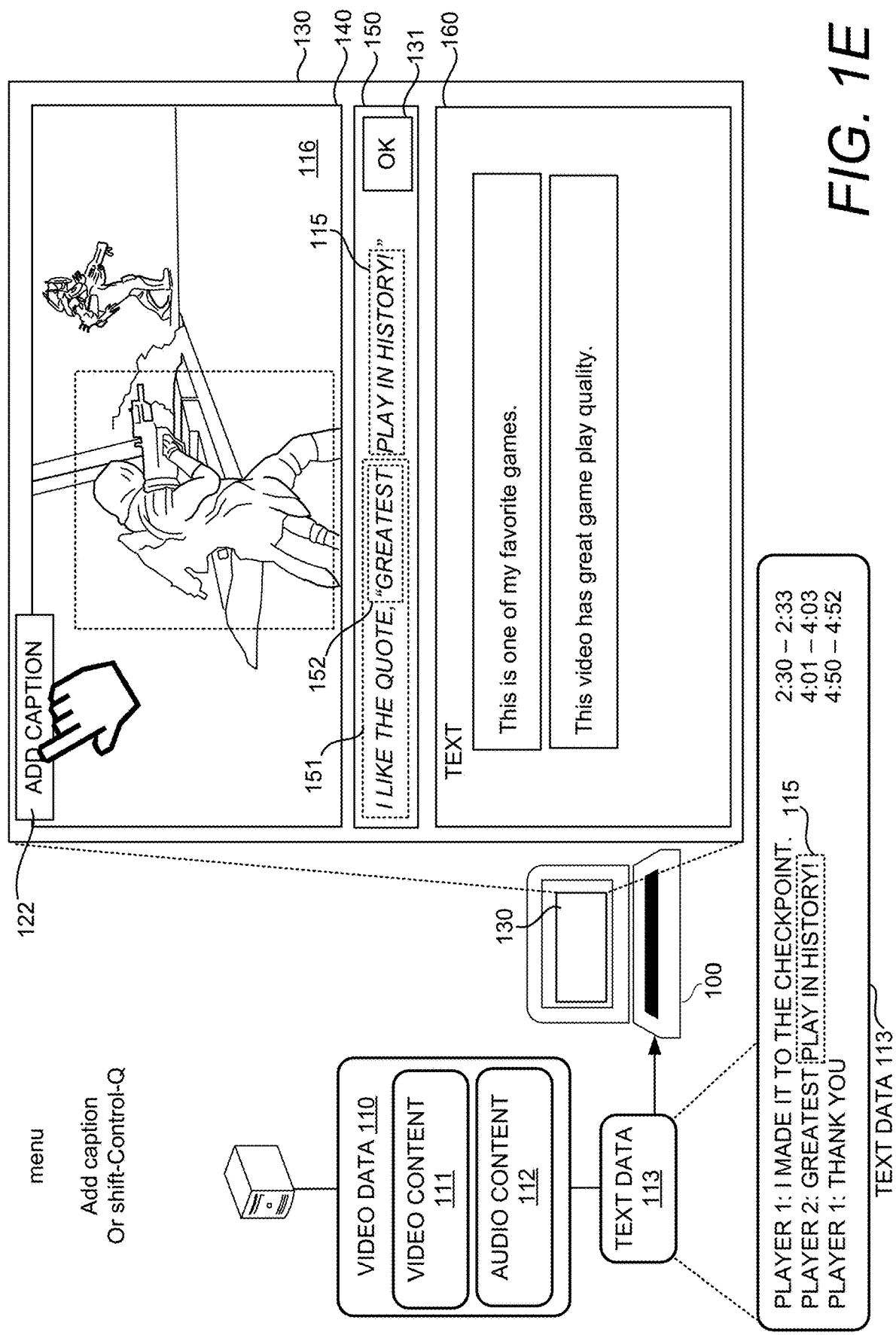
FIG. 1E illustrates additional aspects of the auto completion process utilizing a graphical menu or other types of input for obtaining a caption.

In some configurations, an auto completion process can be based on one or more user inputs. FIG. 1D illustrates aspects of an auto completion process that utilizes a graphical menu for obtaining a caption. In this example, after the user includes at least one keyword 152, the user can take one or more actions, such as the selection of a graphical element 122. As shown in FIG. 1E, in response to a selection of the graphical element 122, the system 101 can obtain the portion 115 of the text data 113 for insertion into the input text field 150. Such an embodiment is optional, as it can be appreciated that the system 100 can automatically populate the input text field in response to receiving at least one keyword or any other text that can be identified with a portion of the text data 113. In other embodiments, instead of displaying a graphical element 122, the system can also receive a predetermined input, such as a special key or a special key sequence (e.g., shift-control-Q), to invoke the system 100 to automatically populate the input text field with a portion 115 of the text data 113.

In some configurations, the system 100 can generate the text data 113 by analyzing the video data 110. FIG. 2 illustrates one example of a process for generating text data 113. In this example, a processor 101 can analyze the audio content 112 associated with the video data 110 to generate the text data 113. For example, if the audio content 112 contains a dialog, the processor 101 can convert the dialogue into a number of phrases 114. Any suitable technique for transcribing an audio signal can be utilized.

In this example, the audio content 112 contains a dialogue between players of a video game. One or more criteria can be used for parsing the phrases 114 of the text data 113 into sentences. The sentences can be generated from the phrases 114 that were transcribed from the audio content 112, wherein the sentences can include punctuation and other identifiers to delineate the phrases. Thus, the criteria can include general grammatical rules of a particular language to identify where the punctuation or other identifiers can be placed to identify a particular quote, e.g., to identify a start and end of a quote. By defining sentences, the start and the end of a particular quote can be utilized to identify the portion of the text data that should be selected for insertion into the text entry field 150. In some configurations, the system 100 can select a sentence having the keyword 152 that was provided as part of an input for insertion in the text entry field 150.

The comment section 160 is also referred to herein as a "text field 160," a "text section 160," or a "notation section 160." The comment section 160 can include any section of a user interface comprising text or any other type of notation that is associated with video content or audio content. For instance, the comment section 160 can be a part of a word processing document, a OneNote file, a spreadsheet, a blog, or any other form of media or data that can cause a computer to render text in conjunction with a rendering of a video.

In other embodiments, the sentences or any other delineated sections of the text data 113 can be identified by a characteristic of a voice. For instance, the system 100 can analyze the audio content to detect at least one of a tone, an inflection point, or a volume of the audio content. If the system 100 detects a threshold level of change with respect to a voice, the system may identify a start point or an end point of a sentence or a delineated section. Similarly, if there is any other type of threshold level of change with respect to a characteristic, such as a volume or any type of inflection, the system may identify a start point or an end point of a sentence or a delineated section. Such techniques can help identify a quote to be inserted into the text entry field 150.

In addition to parsing the text data 113 into sentences or any other type of delineated sections of text, the system 100 can also identify entities associated with each sentence. For instance, the system 100 can analyze the audio content to detect at least one of a tone, an inflection point, or a volume of the audio content. Based on a threshold level of change with respect to at least one of the tone, the inflection point, or the volume, the system 100 can identify an entity, e.g., a particular person, associated with a sentence or delineated section of text. The system 100 can then insert identifiers 117 in the text data 113 for specific sentences or any other delineated section of text.

The system 100 can also identify specific identifier names by interpreting the audio content. For instance, if a name is repeated several times within a particular context, the system 100 can associate that name with a particular section of text. The system can also identify a particular voice by detecting a predetermined tone, pitch, inflection characteristic, etc. The system 100 can also associate a particular voice with a name and associate that name with sections of text associated with a voice having particular characteristics.

In some configurations, the user's intent can be utilized to identify keywords of the input entry that are to be analyzed against the text data. The user's intent can be inferred by one or more characters of the text input. For instance, a single quote character or a double quote character can be utilized to identify a user's intent. In the example shown in FIG. 3, the input entry includes the text: I like the quote, "Greatest, where the entry only includes a single double quote character before the word Greatest. In this example, the double quotes indicate that a following word is part of the spoken content the user hopes to include in their comment. Based on this type of input, the system can search for the keyword immediately following a double quote character, single quote character, etc.

This example is provided for illustrative purposes and is not to be construed as limiting. It can be appreciated that other characters or other visual indicators can imply a user intent to identify keywords. For instance, formatted text, such as bolded text, italicized text or other types of text formats can be used to identify a user's intent. In one illustrative example, if a user text entry includes one or two bolded words, those words can be used to generate a search query to identify spoken content of a video.

In some configurations, the system 100 can utilize time markers associated with a section of text to identify the most relevant section of text for a quote. To illustrate aspects of this feature, FIG. 3 illustrates an example set of text data 113. Such a data set can be generated by the processor 101 by recording a timestamp for each section of text that is transcribed from the audio content. In this particular example, the text data 113 comprises three sentences including the keyword "greatest," and the system recorded a time marker in each sentence having the keyword, e.g., respectively, at 3:20, 7:50 and 9:03.

In some embodiments, a section of text that is selected for insertion into the text entry field 150 can be selected based on a selected time marker 301 relative to a time marker of a particular section of text data 113. In the example of FIG. 3, the system selects the first sentence ("Greatest achievement in history!") since it has a time that is closer to the selected time marker 301 than the times of other sentences ("Greatest player ever!" and "I am the Greatest!").

The selected time marker 301 can be based on a number of factors. In one illustrative example, the selected time marker 301 can be based on a time that is indicated by the user input. For instance, if the user input includes the text, "I like the player's quote at time marker 3:20, Greatest," the system 100 can designate 3:20 as the selected time marker and then select a section of text that is closest to that selected time marker and also include a particular keyword provided by the user input, e.g., "greatest." This way, even if a number of sentences within the text data 113 include a keyword from the user input, the system 100 can be more accurate with respect to a selection of a text section.

In another example, the selected time marker 301 can be based on a current time associated with the rendered content displayed in the video display area. For example, as shown in FIG. 3, a position of a playback cursor 305 shows a current time of a video rendering. Thus, if a user is watching a video and pauses the video at a particular time, e.g., at the 4:00 marker, the system can select a section of text containing the keywords that are closest to that particular time. The selected time marker 301 can also be based on a number of different factors, including a combination of a current time of a video player and a user. This way, if the user input is not entirely accurate with respect to a designated time, the system can analyze a time designated by the input in conjunction with a current time of the player and determine a selected time marker 301.

In some configurations, the system can select, rank and display a number of text sections for a user. For instance, as shown in FIG. 4, system may identify more than one text section containing a keyword provided in the input. In this scenario, the system may generate a user interface 130 comprising a menu 401 that shows each sentence having the keyword. In some configurations, the sentences having the keyword can be ranked based on the level of relevancy. In this example, since the first sentence (3:20) is closer to the selected time marker 301 than the second sentence (7:50), the first sentence may be positioned first within the menu 401. The menu 401 can also be configured to receive user input. In response to a user input that indicates a selection of a particular sentence or section of text, the system can utilize the selected section to populate the text entry field 150.

This example is provided for illustrative purposes and is not to be construed as limiting. It can be appreciated that other variations to the techniques disclosed herein can be within the scope of the present disclosure. For instance, although the selected time marker 301 is indicated as a particular point in time, it can be appreciated that the selected time marker 301 can include an interval of time. Thus, sections of text closest to a selected range or sections of text that are closest to a point within an interval of time can be selected to populate the text entry field 150.

In some embodiments, the menu 401 options can be ranked according to time markers associated with text sections. In the example shown in FIG. 4, each sentence is ranked based on the proximity of an associated time relative to the selected time marker 301.

In some embodiments, the system can filter different menu 401 options based on one or more factors. FIG. 5 illustrates an example of such a feature. In this example, the system can analyze the text data 113 to determine a time marker for a section of text data containing at least one keyword. The system can then determine if an associated time marker for each section of text is within a threshold duration of a current time marker 301. The system can then insert each section of text having an associated time marker within the threshold duration in a menu 401.

In one illustrative example, the system may insert selected sections of the text data in a menu 401 in response to determining that the time marker for the selected sections of the text data is within a predetermined threshold of the current time marker. Thus, the system can filter certain text sections from a ranked list of menu 401 options even if those text sections have a threshold level of relevancy and/or a common keyword with the input text.

Although the examples described herein illustrate embodiments where sections of text are selected based on a keyword, it can be appreciated that other techniques for identifying relevant sections of text can be utilized. For instance, in some embodiments, the system can select sections of text based on a level of relevancy. A level of relevancy can be based on a number of different factors, which can include a context interpreted by the user input. FIGS. 6A, 6B, 7A and 7B illustrate examples of such an embodiment.

In some embodiments the system may select a section of text data 113 based on a user-defined time marker. For example, consider a scenario where a user provided the input text: "I like the quote at time marker 3:30 when he said, "Greatest ___." In this example, the system could select a sentence having the word "Greatest" and having a time marker that is closest to the time marker indicated in the input. FIGS. 6A and 6B illustrate another example of this feature.

In the example shown in FIG. 6A, the input text includes "@7:50." Based on an analysis of this input, the system can select the text section "Greatest play ever!" since this section has an associated time equal to, or within a threshold duration with respect to, the time indicated in the input text. As shown in FIG. 6B, the system selects the section of text data at the time marker indicated in the input text. The selected section of text is then inserted in the text entry field 150.

Figure 7B:
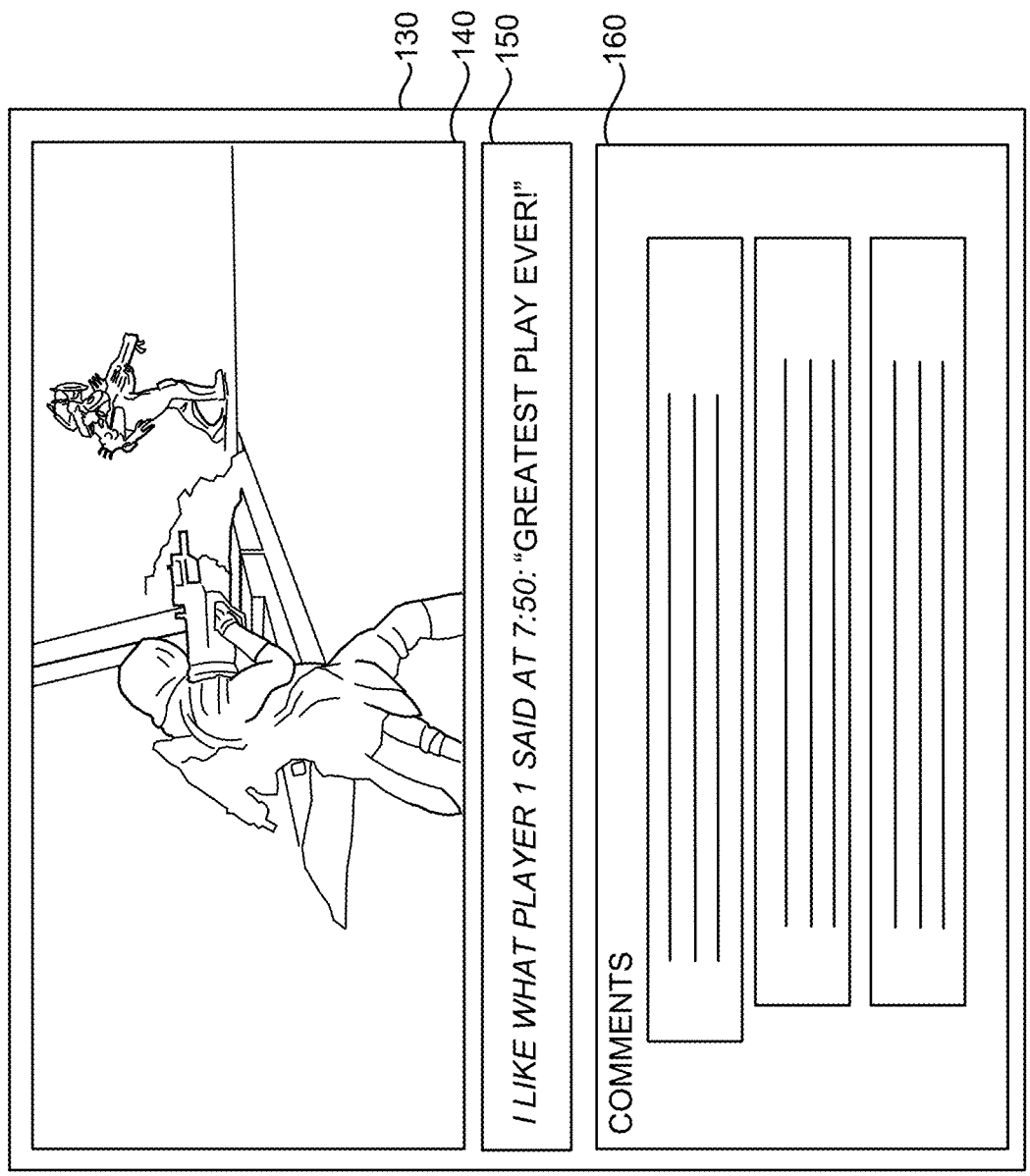
FIG. 7B illustrates an example of a section of text that is selected based on input text indicating a specified time of a video and an entity.

In other embodiments, the system can select one or more text sections based on a combination of indicators provided in the input text. FIGS. 7A and 7B illustrate one example of how multiple indicators are provided within the input text. As shown in FIG. 7A, the input text includes "I LIKE WHAT PLAYER 1 SAID AT 7:50." Based on an analysis of this input, the system can select a text section based on a time indicated in the input text as well as an entity identified in the input text.

In this example, as shown in FIG. 7A, the selected section can include the quote from Player 1 at 7:49 (GREATEST PLAY EVER!) since this section of text has a time that is in a threshold duration from the time indicated in the input text and since this section has an association with the entity indicated in the input text. The other text sections can be eliminated based on the fact that they are outside a threshold duration from the time indicated in the input text or are associated with an entity that is not indicated in the input text. As shown in FIG. 7B, the system selects the section of text data at the time indicated in the input text and inserts it in the text entry field 150.

These examples are provided for illustrative purposes and are not to be construed as limiting. It can be appreciated that sections of text can be selected based on other factors. In another example, the words selected for the autocomplete entry can be determined by the character of a voice associated with the section of text data. In one specific illustration, the words selected for the auto complete entry can be based on an inflection, tone, or volume of a voice associated with that section of text.

FIG. 8A illustrates an example of such an embodiment. Here, the system can analyze the audio content to detect at least one of a tone, an inflection point, or a volume of the section of the audio content. The system can then determine a start point and an end point within the text data based on a threshold change of at least one of the tone, the inflection point, or the volume. The determined start point 801 and the end point 802 can define the boundaries of the section of the text data. In this example, since the tone and the volume exceeded the threshold after a certain point in time, the system can select the text associated with the characteristics, e.g., tone and/or volume, that were presented prior to the change in tone and/or volume, and filter the text with the characteristics that were presented after the change. Such an embodiment can be useful in a situation where the text data 113 may not include punctuation or other text delineators. Thus, if the text data 113 includes a long string of text, or if the punctuation is incorrect, the system can select contextually relevant text based on the characteristics of the audio content.

In some configurations, the system can select a style, arrangement, appearance, or punctuation for the selected text. Such characteristics of the text can be based on an analysis of the audio content. For instance, if the system determines that a voice associated with a section of text was raised, the system may generate a visual indicator to indicate the raised voice. FIG. 8B illustrates an example of this feature. As shown, as one or more characteristics of a voice changes, the system may automatically format a selected section of text that's inserted into the text entry field 150. In this example, given that the rate of change of the tone and/or the rate of change with respect to the volume exceeded a threshold, the system formatted the word "history" to emphasize the associated text.

This example is provided for illustrative purposes and is not to be construed as limiting. It can be appreciated that other characteristics, tone or volume, of a voice or sound associated with a section of text can be utilized to format the display of text within the text entry field 150. It can also be appreciated that a threshold level of change and/or a rate of change (shown in the drawings as a "slope") of a characteristic can be utilized to select the typography of any displayed text. The selected typography can include any technique of arranging text to make it more prominent, legible, readable, and/or appealing when displayed. The arrangement of type involves selecting typefaces, point sizes, line lengths, line-spacing, and letter-spacing, and adjusting the spacing between pairs of letters. The term typography is also applied to the style, arrangement, and appearance of the letters, numbers, and symbols created by the process.

Although the examples disclosed herein illustrate embodiments that involve a text entry, the techniques disclosed herein can identify any type of content related to a video based on any user input indicating specified content. In another illustrative example, a user input indicating a melody can be utilized to identify specific audio content related to a video. Such an example can be shown in FIGS. 9A-9D.

Referring now to FIG. 9A, an example scenario of a user 901 providing an input 903, such as a melody is shown. In this example, the user 901 provides (e.g., intones, sings, chats, says, hums, speaks) a melody to an input device such as a microphone 902. In some configurations, a melody can include a vocal input comprising a series of tones. The input 903 can include any an audible sound captured by a microphone or text received from an input device. The input 903 can be received in association with a character input or a predetermined key input or a selection of a menu item. In response to the input 903, the system 100 analyzes the melody and determines a sequence of notes 181 defining the melody. This process can utilize any suitable technology for transcribing a user's voice to any type of notation.

Figure 9B:
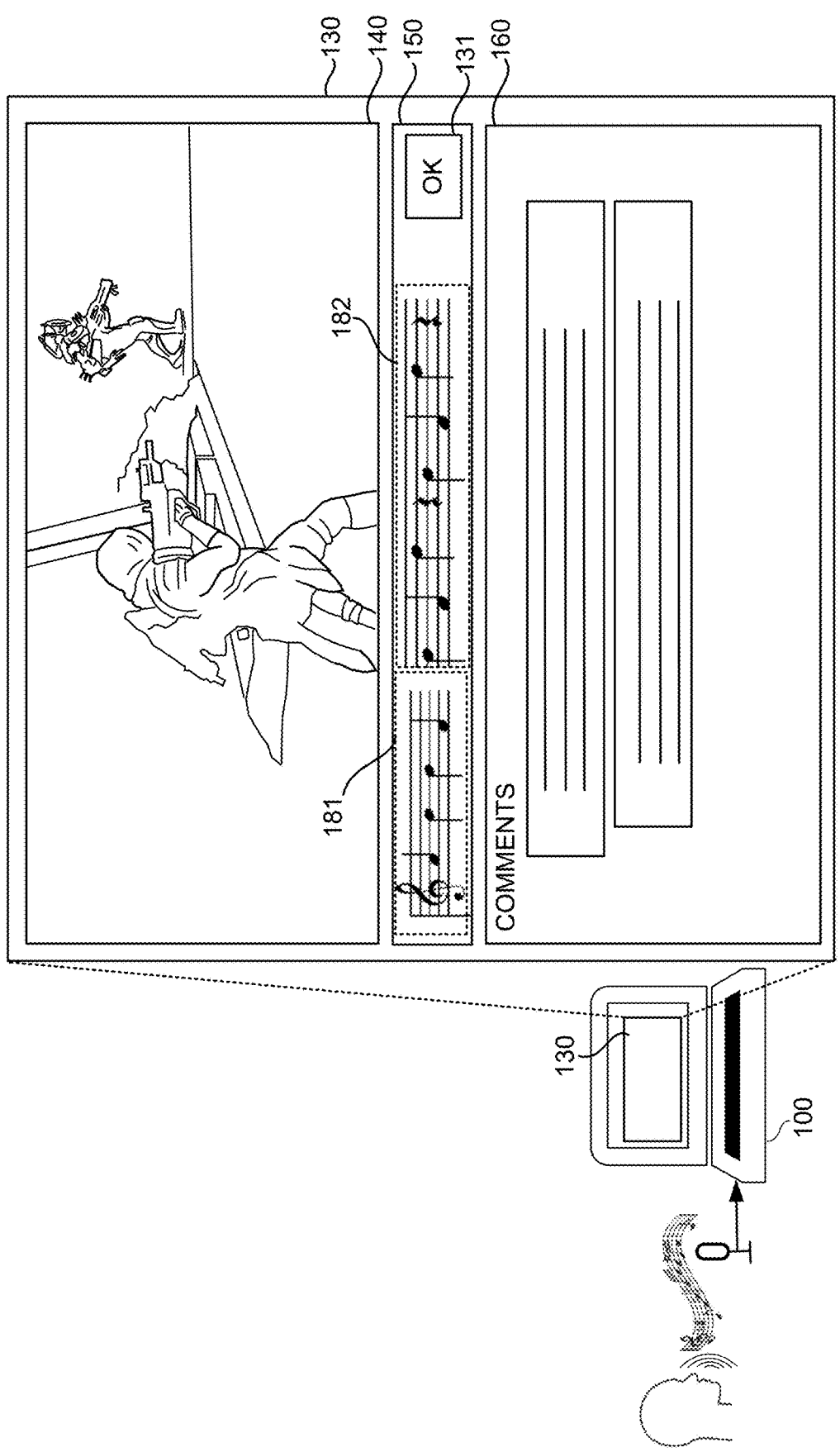
FIG. 9B illustrates an auto-completion process for generating an output notation that is based on an analysis of audio content that has a threshold level of relevancy to the notation that is generated from the user input.

As shown in FIG. 9B, the system 100 can identify an audio clip with the audio content 112 that has a threshold level of relevancy to the sequence of notes 181. Any suitable technology for processing the audio content 112 to identify specific audio content based on a sequence of notes or a melody provided by user can be utilized. In some configurations, the system 100 can cause one or more processes that compares the sequence of notes and/or the user's melody to different sections of the audio content 112. A confidence score can be generated for different sections of the audio content 112. Any section of the audio content 112 having a confidence score above a threshold can be identified as relevant audio content. The system can then generate an output 182 that defines the section of audio content 112 having the threshold level of relevancy to the user's melody and/or the sequence of notes 181. The output 182, which can be in the form of a graphical representation of the section of audio content 112, can be in any format that conveys or models a melody, series of notes, a series of tones, a series of tone changes, etc.

Figure 9D:
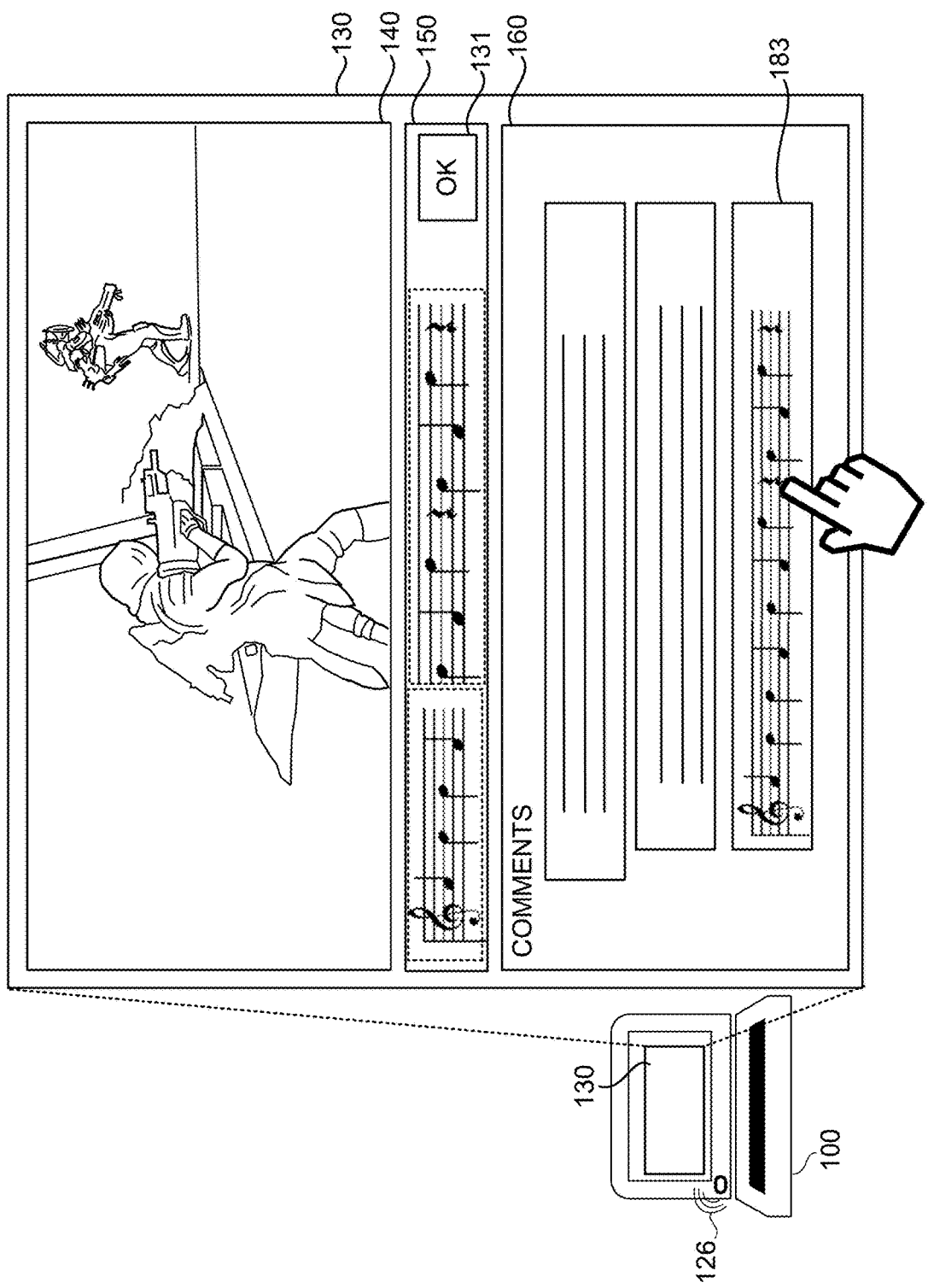
FIG. 9D illustrates an example of how audio content related to the generated notation can be rendered.

Next, as shown in FIG. 9C, a user input can cause the computing device 100 to generate an entry 183 within a notation section 160 of the user interface 130. It can be appreciated that the user input can be based on a selection of a user interface element 131 or any other type of input. For instance, the input can include a voice command, a gesture, or any other type of user input that provides an indication of a user's intent to add an entry 183 within the notation section 160 or any other section of a user interface. It can be appreciated that the entry 183 can also include a link that is associated with a section of audio content 112 having the threshold level of relevancy to the user's melody and/or the sequence of notes 181. Thus, as shown in FIG. 9D, in response to a user input, such as a selection of the entry 183, the system 100 can render an audio output 126 section of audio content 112 having the threshold level of relevancy to the user's melody and/or the sequence of notes 181.

Figure 10:
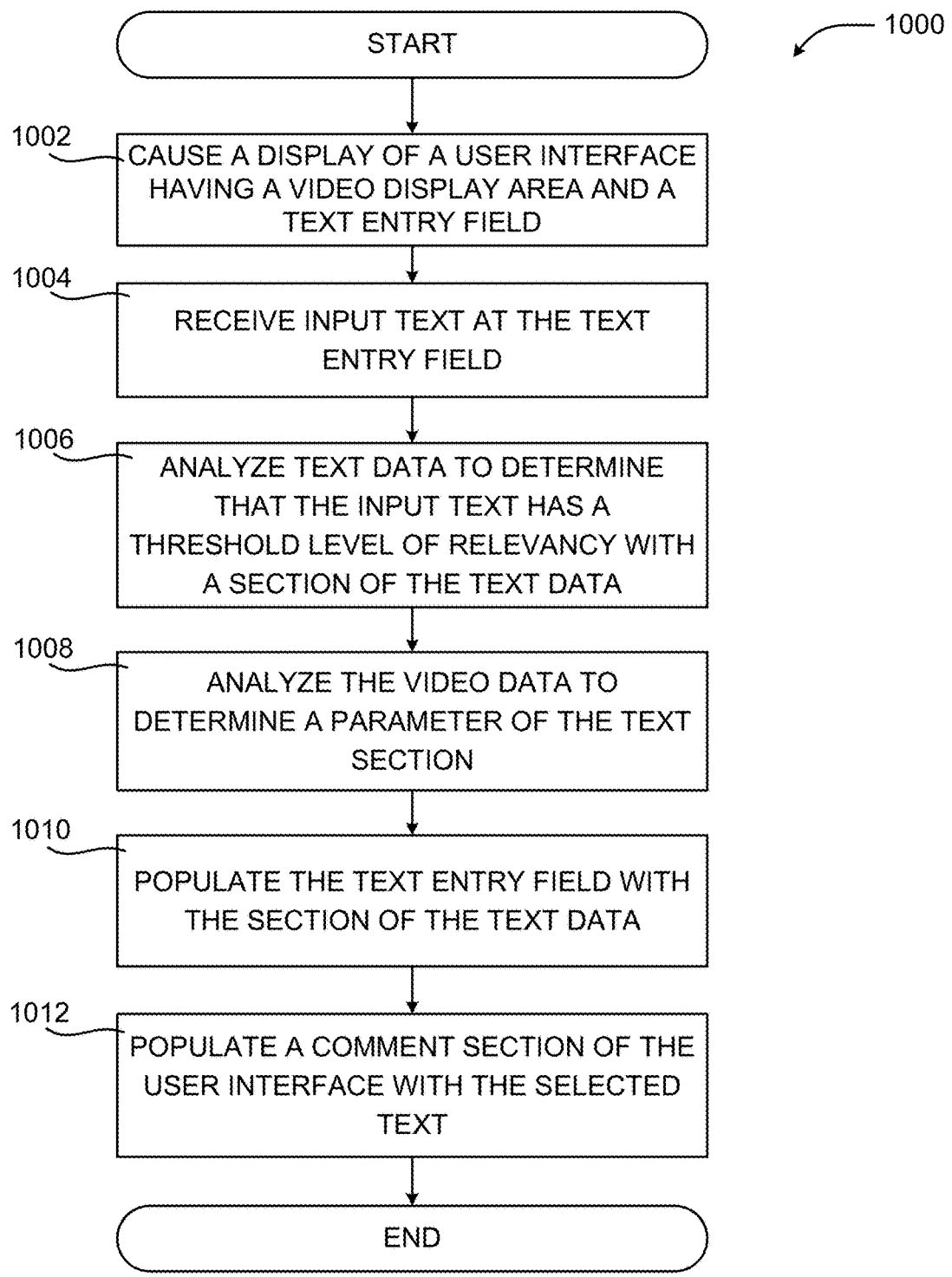
FIG. 10 is a flow diagram illustrating aspects of a routine for computationally efficient generation of spoken content of a video.

FIG. 10 is a diagram illustrating aspects of a routine 1000 for computationally efficient generation and management of a text section. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a video (e.g., live content, broadcasted event, recorded content, etc.) and/or a presentation UI that includes renderings of one or more participants of remote computing devices, avatars, channels, chat sessions, video streams, images, virtual objects, and/or applications associated with a video.

The routine 1000 begins at operation 1002, where the system can cause a display of a user interface having a video display area and a text entry field. One example of a user interface is shown in FIG. 1A. In some configurations, the user interface can also include a comments section. The user interface can be displayed on the client device such as a tablet, mobile phone, desktop computer, etc.

Next, at operation 1004, the system can receive input text at the text entry field. In some configurations, the text input can include a keyword or phrase. The input text can be received by an input device such as a touch screen, keyboard, or any other suitable input device. The input text can also be received by a gesture captured by a camera of a device or received by capturing an audio signal by a speaker of a device.

Next, at operation 1006, the system can analyze text data to determine that the input text has a threshold level of relevancy with a section of the text data. In some configurations, the threshold level of relevancy can be based on common keywords between the input text and sections of text data. The threshold level of relevancy can also be based on a selected time marker or a predetermined timeline. For instance, if a section of text data is associated with a time within a threshold of the selected time marker, that section of text may be selected for the text entry field. Alternatively, if a section of text is within a predetermined timeline, that section of text may be selected for the text entry field. The selected time marker may be based on a current position of a video player, a time marker indicated in the input text, or a time marker otherwise indicated by the user. The text data can be received by the system, such as closed captioning text, or the text data can be generated by the system by an analysis of the audio content associated with the video data.

Next, at operation 1008, the system can analyze video data to determine a parameter for the selected text section. For instance, a tone or volume of an audio track (e.g., audio content) associated with the text section can be used to select specific words of the text section to be inserted in the text entry field. Such a feature can be used when identifiers, such as a name of a speaker, are not provided with the text data. In another example, a tone or volume of an audio track associated with the text section can be used to format the text to bring highlight to certain words or phrases.

Next, at operation 1010, the system can populate the selected text section in the text entry field. In some configurations, a portion of the selected text section can be added to existing text within the text entry field to function as an auto-completion (e.g., line-completion) feature. For instance, if a user enters an initial keyword, and that initial keyword is the first word of the selected text, the system may maintain the user's entry of the initial keyword and only add portions of the selected text that do not include the initial keyword.

Next, at operation 1012, the system can populate a comment section of the user interface with the selected text section. In some configurations, the system can populate the comment section in response to a user input accepting the selected text section. The user input can be a voice command, a gesture captured by a camera, or any other suitable interaction with the computer. In operation 1012, the text section displayed within the comment section can be formatted according to the analysis performed at operation 1008.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
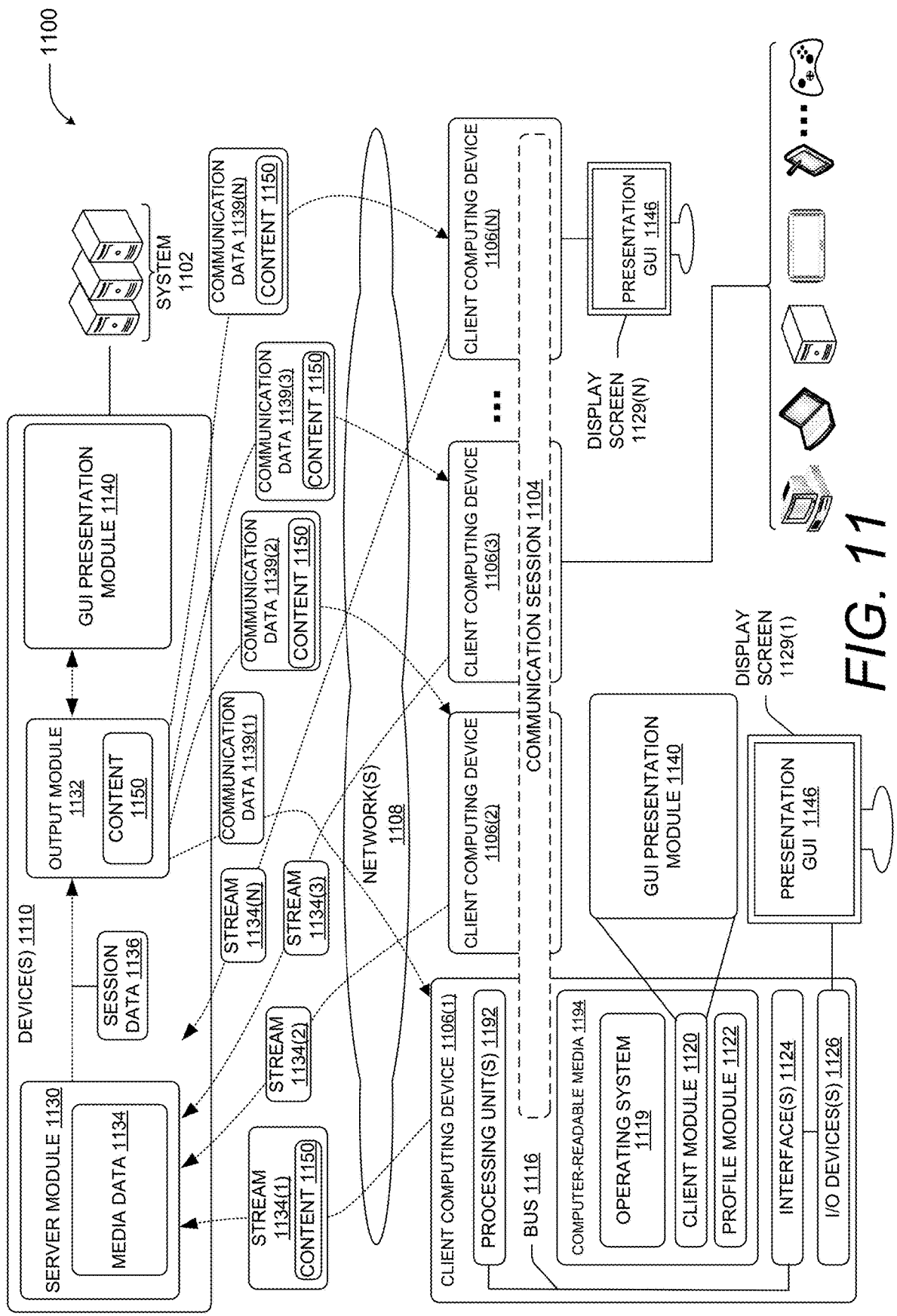
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. Although this embodiment illustrates a communication session 1104, can be appreciated that a communication session 1104 is not necessary for every embodiment disclosed herein. It can be appreciated that video streams can be uploaded by each client 1106 and that comments can be provided by each client 1106. It can be appreciated that any client 1106 can also receive video data and audio data from the server module 1130.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations. In the examples described herein, some embodiments may not utilize the communication session 1104. In some embodiments, a video may be uploaded to the server module 1130 from at least one of the client computing devices, e.g., 1106(1), 1106(2). When video content is uploaded to the server module 1130, any client computing device can access the uploaded video content and display that video content within a user interface such as those described above.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a Channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as YOUTUBE, FACEBOOK, SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134 (N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, image, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
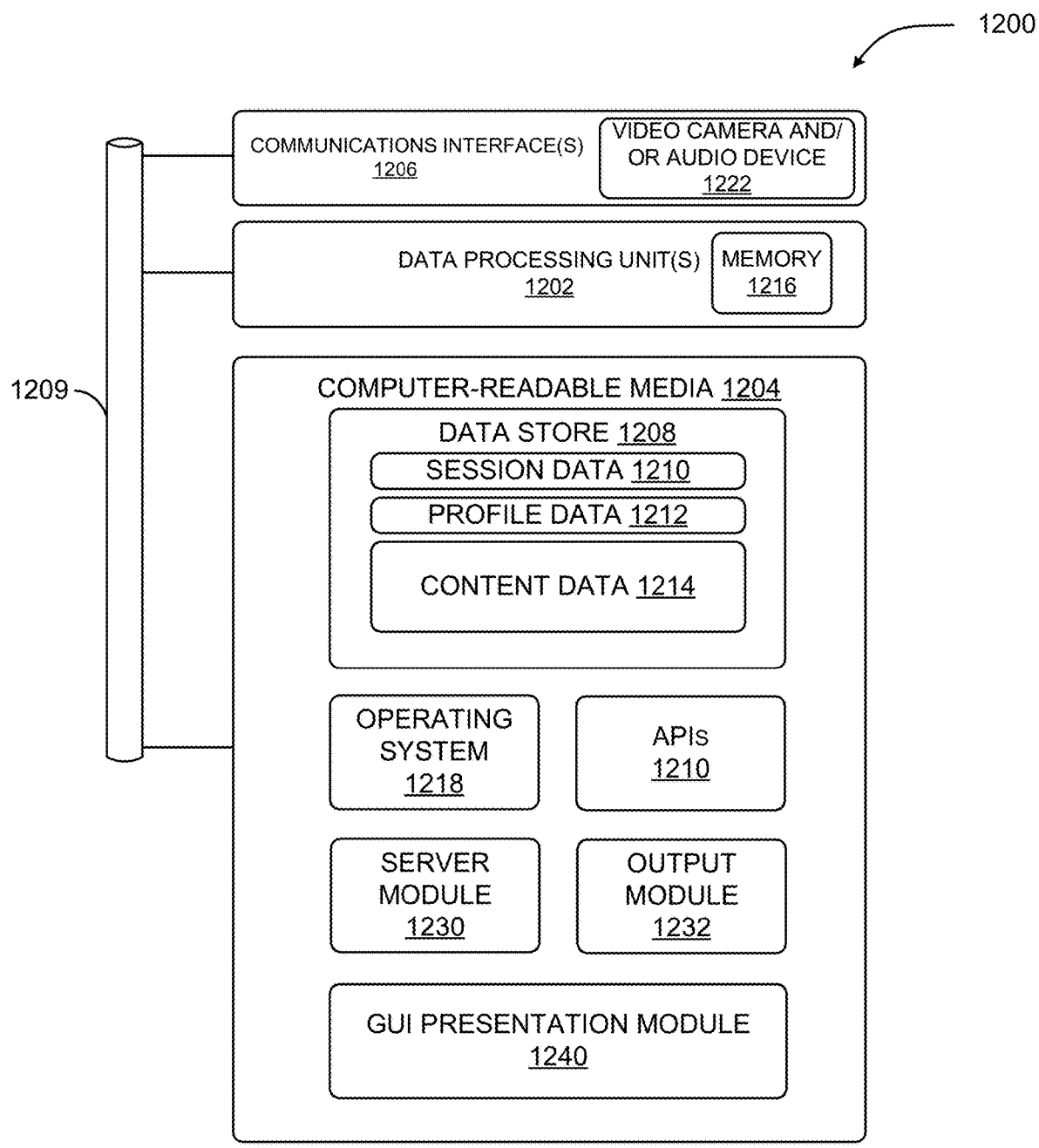
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device 100" or a "system 100") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1. A method for execution to be performed by a data processing system, the method comprising: causing a display of a user interface comprising a video display area, a text entry field, and a text section; processing video content of video data to generate rendered content for display within the video display area; receiving input text at the text entry field, the input text comprising at least one keyword; identifying a section of text data having the at least one keyword; and inserting the section of the text data having the at least one keyword in the text entry field, the user interface configured to display the section of the text data in the comment section responsive to receiving a confirmation input.

Clause 2. The method of clause 1, further comprising: processing audio content associated with the video data to generate the text data comprising phrases expressed in the audio content; parsing the text data into a plurality of sentences based on one or more criteria; and selecting a sentence having the at least one keyword, wherein inserting the section of the text data in the text entry field comprises inserting the selected sentence in the text entry field.

Clause 3. The method of clause 1 and clause 2, further comprising: analyzing the text data to determine an individual time for phrases in the text data that contains the at least one keyword; selecting an individual phrase from a plurality of phrases having the individual time that is closer to a selected time marker than an individual time of another phrase of the plurality of phrases also including the at least one keyword; and inserting the individual phrase as the section of the text data to be inserted in the text entry field.

Clause 4. The method of clauses 1-3, wherein the selected time marker is based on a time indicated in the input text.

Clause 5. The method of clauses 3-4, wherein the selected time marker is based on a position of a playback cursor associated with the rendered content displayed in the video display area.

Clause 6. The method of clauses 1-5, further comprising: analyzing the text data to determine a time marker for the section of the text data containing the at least one keyword; determining that the time marker is within a predetermined threshold of the current time marker for the rendered content displayed in the video display area; and inserting the section of the text data in the text entry field in response to determining that the time marker for the section of the text data is within the predetermined threshold of the current time marker for the rendered content displayed in the video display area.

Clause 7. The method of clauses 1-6, further comprising: analyzing audio content associated with the video content with the to detect at least one of a tone, an inflection point, or a volume of the section of the audio content; and determining a start point and an end point within the text data based on a threshold change of at least one of the tone, the inflection point, or the volume, wherein the start point and the end point define the boundaries of the section of the text data.

Clause 8. The method of clauses 1-7, further comprising: analyzing the audio content associated with the video content to detect at least one of a tone, an inflection point, or a volume of the audio content; and determining a start point and an end point within the text data based on a threshold change of at least one of the tone, the inflection point, or the volume, wherein the start point and the end point define the boundaries of the section of the text data.

Clause 9. The method of clauses 1-8, further comprising: analyzing audio content associated with the video content to detect at least one of a tone, an inflection point, or a volume of the audio content; determining a threshold level of at least one of the tone, the inflection point, or the volume of the audio content; and selecting at least one of a style, arrangement, or appearance of the characters of the section of the text data in response to determining the threshold level of at least one of the tone, the inflection point, or the volume of the audio content.

Clause 10. The method of clauses 1-9, further comprising: analyzing audio content associated with the video content to detect at least one of a tone or a volume of the audio content; determining a threshold degree of change of at least one of the tone or the volume of the audio content; and selecting at least one of a style, arrangement, or appearance of the characters of the section of the text data in response to determining the threshold change of at least one of the tone or the volume of the audio content.

Clause 11. A system comprising: one or more processing units; and a computer-readable medium having encoded thereon computer-executable instructions to cause the one or more processing units to execute a method comprising causing a display of a user interface comprising a video display area, and an entry field; processing video content of video data to generate rendered content within the video display area; receiving an input at the entry field; analyzing text data associated with the video data to determine that the input has a threshold level of relevancy with a section of the text data; and in response to determining that the input has the threshold level of relevancy with the section of the text data, inserting the section of the text data in the entry field.

Clause 12. The method of clause 11, wherein the method further comprises: receiving a confirmation input indicating an acceptance of the section of the text data; and in response to the confirmation input, inserting the section of the text data in a comment section of the user interface, wherein the section of the text data in the comment section is configured to cause an audio rendering of the audio content on a speaker.

Clause 13. The system of clauses 11-12, wherein the input has the threshold level of relevancy with the section of the text data based on a number of common keywords between the input and the section of the text data.

Clause 14. The system of clauses 11-13, wherein the input has the threshold level of relevancy with the section of the text data based on a threshold difference between a time marker indicated in the input and a time associated with the section of the text data.

Clause 15. The system of clause 11-14, wherein the input has the threshold level of relevancy with the section of the text data based on an identifier referenced in the input and another identifier associated with the section of the text data, and a threshold difference between a time marker indicated in the input and a time associated with the section of the text data.

Clause 16. The system of Clauses 11-15, wherein the input has the threshold level of relevancy with the section of the text data based on an identifier referenced in the input and another identifier associated with the section of the text data, and a number of common keywords between the input and the section of the text data.

Clause 17. A system, comprising: means for displaying a user interface comprising a video display area, an entry field, and a comment section; means for processing video content of video data to generate rendered content for display within the video display area; means for receiving an input at the entry field, the input comprising at least one keyword or a vocal input comprising a series of tones; means for selecting a section of text data having the at least one keyword or a portion of audio content having a threshold level of relevancy to a sequence of notes in the series of tones; and means for populating the section of the text data having the at least one keyword or a representation of the portion of audio content in the entry field, the user interface configured to display the section of the text data or the representation of the portion of audio content in the comment section responsive to receiving a confirmation input.

Clause 18. The system of clause 17, further comprising: means for processing audio content associated with the video data to generate the text data comprising phrases expressed in the audio content; means for parsing the text data into a plurality of sentences based on one or more criteria; and means for selecting a sentence having the at least one keyword, wherein populating the section of the text data in the entry field comprises inserting the selected sentence in the entry field.

Clause 19. The system of clauses 17-18, further comprising: means for analyzing the text data to determine an individual time for each phrase in the text data that contains the at least one keyword; means for selecting an individual phrase from a plurality of phrases having the individual time that is closer to a selected time marker than an individual time of another phrase of the plurality of phrases also including the at least one keyword; and means for inserting the individual phrase as the section of the text data to be inserted in the entry field.

Clause 20. The system of clauses 17-19, further comprising: means for analyzing the text data to determine a time marker for the section of the text data containing the at least one keyword; means for determining that the time marker is within a predetermined threshold of the current time marker for the rendered content displayed in the video display area; and means for populating the section of the text data in the entry field in response to determining that the time marker for the section of the text data is within the predetermined threshold of the current time marker for the rendered content displayed in the video display area.

The invention claimed is:

1. A method for execution to be performed by a data processing system, the method comprising:
   causing a display of a user interface comprising a video display area, a text entry field, and a text section;
   processing video content of video data to generate rendered content for display within the video display area;
   receiving input text at the text entry field, the input text comprising at least one keyword;
   responsive to the input text:
      identifying, based on the at least one keyword, a section of text data corresponding to verbal content included in the video content having the at least one keyword; and
      inserting the identified section of the text data corresponding to verbal content included in the video content having the at least one keyword in the text entry field; and
   causing a display of the input text and the inserted section of the text data in the comment section responsive to receiving a confirmation input.

2. The method of claim 1, further comprising:
   processing audio content associated with the video data to generate the text data comprising phrases expressed in the audio content;
   parsing the text data into a plurality of sentences based on one or more criteria; and
   selecting a sentence having the at least one keyword, wherein inserting the section of the text data in the text entry field comprises inserting the selected sentence in the text entry field.

3. The method of claim 1, further comprising:
   analyzing the text data to determine an individual time for phrases in the text data that contains the at least one keyword;
   selecting an individual phrase from a plurality of phrases having the individual time that is closer to a selected time marker than an individual time of another phrase of the plurality of phrases also including the at least one keyword; and
   inserting the individual phrase as the section of the text data to be inserted in the text entry field.

4. The method of claim 3, wherein the selected time marker is based on a time indicated in the input text.

5. The method of claim 3, wherein the selected time marker is based on a position of a playback cursor associated with the rendered content displayed in the video display area.

6. The method of claim 1, further comprising:
   analyzing the text data to determine a time marker for the section of the text data containing the at least one keyword;
   determining that the time marker is within a predetermined threshold of the current time marker for the rendered content displayed in the video display area; and
   inserting the section of the text data in the text entry field in response to determining that the time marker for the section of the text data is within the predetermined threshold of the current time marker for the rendered content displayed in the video display area.

7. The method of claim 1, further comprising:
   analyzing audio content associated with the video content to detect at least one of a tone, an inflection point, or a volume of the section of the audio content; and
   determining a start point and an end point within the text data based on a threshold change of at least one of the tone, the inflection point, or the volume, wherein the start point and the end point define one or more boundaries of the inserted section of the text data.

8. The method of claim 1, further comprising:
   analyzing audio content associated with the video content to detect at least one of a tone, an inflection point, or a volume of the audio content; and
   determining a start point and an end point within the text data based on a threshold change of at least one of the tone, the inflection point, or the volume, wherein the start point and the end point define one or more time boundaries of the inserted section of the text data.

9. The method of claim 1, further comprising:
analyzing audio content associated with the video content to detect at least one of a tone, an inflection point, or a volume of the audio content;
determining a threshold level of at least one of the tone, the inflection point, or the volume of the audio content; and
selecting at least one of a style, arrangement, or appearance of the characters of the section of the text data in response to determining the threshold level of at least one of the tone, the inflection point, or the volume of the audio content.

10. The method of claim 1, further comprising:
analyzing audio content associated with the video content to detect at least one of a tone or a volume of the audio content;
determining a threshold degree of change of at least one of the tone or the volume of the audio content; and
selecting at least one of a style, arrangement, or appearance of the characters of the section of the text data in response to determining the threshold change of at least one of the tone or the volume of the audio content.

11. A system comprising:
a processor; and
a computer storage media having encoded thereon computer-executable instructions to cause the processor to execute a method comprising
causing a display of a user interface comprising a video display area, and an entry field;
processing video content of video data to generate rendered content within the video display area;
receiving an input at the entry field;
analyzing text data associated with the video data to determine that the input has a threshold level of relevancy with a section of the text data; and
in response to determining that the input has the threshold level of relevancy with the section of the text data, inserting the section of the text data in the entry field.

12. The method of claim 11, wherein the method further comprises:
receiving a confirmation input indicating an acceptance of the section of the text data; and
in response to the confirmation input, inserting the section of the text data in a comment section of the user interface, wherein the section of the text data in the comment section is configured to cause an audio rendering of the audio content on a speaker.

13. The system of claim 11, wherein the input has the threshold level of relevancy with the section of the text data based on a number of common keywords between the input and the section of the text data.

14. The system of claim 11, wherein the input has the threshold level of relevancy with the section of the text data based on a threshold difference between a time marker indicated in the input and a time associated with the section of the text data.

15. The system of claim 11, wherein the input has the threshold level of relevancy with the section of the text data based on an identifier referenced in the input and another identifier associated with the section of the text data, and a threshold difference between a time marker indicated in the input and a time associated with the section of the text data.

16. The system of claim 11, wherein the input has the threshold level of relevancy with the section of the text data based on an identifier referenced in the input and another identifier associated with the section of the text data, and a number of common keywords between the input and the section of the text data.

17. A system, comprising:
a processor;
a computer storage media having encoded thereon computer-executable instructions to cause the processor to:
display a user interface comprising a video display area, an entry field, and a comment section;
process video content of video data to generate rendered content for display within the video display area;
receive an input at the entry field, the input comprising at least one keyword or a vocal input comprising a series of tones;
select a section of text data having the at least one keyword or a portion of audio content having a threshold level of relevancy to a sequence of notes in the series of tones; and
populate the section of the text data having the at least one keyword or a representation of the portion of audio content the user interface configured to display the section of the text data or the representation of the portion of audio content in the comment section responsive to receiving a confirmation input.

18. The system of claim 17, wherein the instructions further cause the processor to:
process audio content associated with the video data to generate the text data comprising phrases expressed in the audio content;
parse the text data into a plurality of sentences based on one or more criteria; and
select a sentence having the at least one keyword, wherein populating the section of the text data in the entry field comprises inserting the selected sentence in the entry field.

19. The system of claim 17, wherein the instructions further cause the processor to:
analyze the text data to determine an individual time for each phrase in the text data that contains the at least one keyword;
select an individual phrase from a plurality of phrases having the individual time that is closer to a selected time marker than an individual time of another phrase of the plurality of phrases also including the at least one keyword; and
insert the individual phrase as the section of the text data to be inserted in the entry field.

20. The system of claim 17, wherein the instructions further cause the processor to:
analyze the text data to determine a time marker for the section of the text data containing the at least one keyword;
determine that the time marker is within a predetermined threshold of the current time marker for the rendered content displayed in the video display area; and
populate the section of the text data in the entry field in response to determining that the time marker for the section of the text data is within the predetermined threshold of the current time marker for the rendered content displayed in the video display area.

* * * * *